US010379666B2

(12) United States Patent
Park et al.

(10) Patent No.: US 10,379,666 B2
(45) Date of Patent: Aug. 13, 2019

(54) POSITION MEASURING APPARATUS, PEN AND POSITION MEASURING METHOD

(71) Applicant: Samsung Electronics Co., Ltd., Suwon-si, Gyeonggi-do (KR)

(72) Inventors: Sung-Soo Park, Suwon-si (KR); Gwan-Hyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 14/625,069

(22) Filed: Feb. 18, 2015

(65) Prior Publication Data

US 2015/0160782 A1 Jun. 11, 2015

Related U.S. Application Data

(63) Continuation-in-part of application No. 13/857,713, filed on Apr. 5, 2013, now Pat. No. 9,495,045.

(30) Foreign Application Priority Data

May 11, 2012 (KR) ........................ 10-2012-0050371

(51) Int. Cl.

| | |
|---|---|
| ***G06F 3/038*** | (2013.01) |
| ***G06F 3/041*** | (2006.01) |
| ***G06F 3/044*** | (2006.01) |
| ***G06F 3/0354*** | (2013.01) |

(52) U.S. Cl.

CPC .......... *G06F 3/0418* (2013.01); *G06F 3/0383* (2013.01); *G06F 3/03545* (2013.01); *G06F 3/044* (2013.01); *G06F 3/0414* (2013.01); *G06F 3/0416* (2013.01); *G06F 2203/04104* (2013.01); *G06F 2203/04106* (2013.01); *G06F 2203/04112* (2013.01)

(58) Field of Classification Search

CPC .... G06F 3/044; G06F 3/03545; G06F 3/0416; G06F 2203/04106; G06F 2203/04104

See application file for complete search history.

(56) References Cited

U.S. PATENT DOCUMENTS

| | | | |
|---|---|---|---|
| 5,571,997 | A | 11/1996 | Gray et al. |
| 5,661,269 | A | 8/1997 | Fukuzaki et al. |
| 5,672,852 | A | 9/1997 | Fukuzaki et al. |

(Continued)

FOREIGN PATENT DOCUMENTS

| | | | |
|---|---|---|---|
| CN | 1659502 | A | 8/2005 |
| CN | 1679078 | A | 10/2005 |

(Continued)

OTHER PUBLICATIONS

Korean Office Action with English translation dated Apr. 29, 2019; Korean Appln. No. 10-2012-0050371.

*Primary Examiner* — Nitin Patel
*Assistant Examiner* — Amy Onyekaba
(74) *Attorney, Agent, or Firm* — Jefferson IP Law, LLP

(57) ABSTRACT

A position measuring apparatus that measures an input position of a pen is disclosed. A position measuring apparatus according to an embodiment of the present disclosure may include one or more electrodes, and a control unit that controls to transmit an electric field transmission signal generated from one or more electrodes to the pen and receives an electric field reception signal corresponding to the electric field transmission signal.

12 Claims, 42 Drawing Sheets

(56) References Cited

U.S. PATENT DOCUMENTS

| | | | | |
|---|---|---|---|---|
| 5,679,930 | A | 10/1997 | Katsurahira | |
| 5,790,106 | A * | 8/1998 | Hirano | G06F 3/041 178/18.06 |
| 5,898,136 | A | 4/1999 | Katsurahira | |
| 8,022,317 | B2 | 9/2011 | Ely | |
| 8,618,815 | B2 | 12/2013 | Lin | |
| 2003/0095115 | A1 | 5/2003 | Brian et al. | |
| 2004/0233178 | A1 | 11/2004 | Silk et al. | |
| 2005/0122319 | A1 | 6/2005 | Sakurai et al. | |
| 2005/0162411 | A1 | 7/2005 | Berkel Van | |
| 2008/0023232 | A1 | 1/2008 | Morag et al. | |
| 2008/0150916 | A1 | 6/2008 | Vos | |
| 2009/0076770 | A1 * | 3/2009 | Fukushima | G06F 3/03545 702/150 |
| 2010/0013792 | A1 * | 1/2010 | Fukushima | G06F 3/03547 345/174 |
| 2010/0328249 | A1 * | 12/2010 | Ningrat | G06F 3/044 345/174 |
| 2011/0122087 | A1 * | 5/2011 | Jang | G06F 3/044 345/174 |
| 2011/0155479 | A1 * | 6/2011 | Oda | G06F 3/03545 178/18.06 |
| 2011/0216032 | A1 * | 9/2011 | Oda | G06F 3/044 345/174 |
| 2011/0298421 | A1 | 12/2011 | Palay et al. | |
| 2012/0050207 | A1 | 3/2012 | Westhues et al. | |
| 2012/0068964 | A1 * | 3/2012 | Wright | G06F 3/03545 345/174 |
| 2012/0327040 | A1 | 12/2012 | Simon et al. | |
| 2013/0207926 | A1 * | 8/2013 | Kremin | G06F 3/0383 345/174 |
| 2013/0207939 | A1 * | 8/2013 | Kremin | G06F 3/0383 345/179 |
| 2014/0078101 | A1 * | 3/2014 | Katsurahira | G06F 3/044 345/174 |
| 2014/0104188 | A1 * | 4/2014 | Bakken | G06F 3/044 345/173 |

FOREIGN PATENT DOCUMENTS

| | | | |
|---|---|---|---|
| EP | 2 325 736 | A2 | 5/2011 |
| JP | H06-250772 | A | 9/1994 |
| KR | 10-2011-0057501 | A | 6/2011 |

* cited by examiner

POSITION MEASURING APPARATUS, PEN AND POSITION MEASURING METHOD

CROSS-REFERENCE TO RELATED APPLICATION

This application is a continuation application of a prior application Ser. No. 13/857,713, filed on Apr. 5, 2013, which claimed the benefit under 35 U.S.C § 119(a) of a Korean patent application filed on May 11, 2012 in the Korean Intellectual Property Office and assigned Serial number 10-2012-0050371, the entire disclosures of each of which are hereby incorporated by reference.

TECHNICAL FIELD

The present disclosure relates to a position measuring apparatus, a pen, and a position measuring method.

BACKGROUND

Currently, a smart phone or a tablet PC is actively disseminated, and a technology for a contact position measurement apparatus embedded in the smart phone or the tablet PC is also actively developed. The smart phone or the tablet PC mainly includes a touch screen, and a user designates a particular coordinate of the touch screen by using a finger or a stylus pen. The user can input a particular signal in the smart phone by designating the particular coordinate of the touch screen.

The touch screen may operate based on an electricity type, an infrared light type, an ultrasonic wave type and the like, and an example of the electricity operation type may include an R type touch screen (resistive touch screen) or a C type touch screen (capacitive touch screen). Among touch screens, the R type touch screen capable of simultaneously recognizing a user's finger and a stylus pen has been widely used in the related art, but the R type touch screen has a problem in that there is a reflection due to an air space between ITO layers. More specifically, transmissivity of light penetrating a display is reduced due to the air space between the ITO layers, and an external light reflection is increased.

Accordingly, currently, the C type touch screen is widely applied. The C type touch screen operates in a mode of detecting a difference in capacitance of a transparent electrode generated by a contact of an object. However, since the touch screen has difficulty in physically distinguishing between a hand and a pen, an unintended operation error by a contact of the hand may occur when the pen is used.

The related art to solve the above mentioned problem includes a method using software for distinguishing between the hand and the pen according to a contact area, and a method including a separate position measurement apparatus such as an Electro Magnetic Resonance (EMR) technique as well as the C type touch screen. However, the method of using software cannot completely resolve the unintended operation error generated due to the contact of the hand, and the method including the separate measurement apparatus increases volume, weight, and costs by requiring additional components.

Therefore, it is required to develop a technology capable of performing a determination without the operation error when an object, such as the stylus pen, is used without using a separate position measurement apparatus.

SUMMARY

The present disclosure may provide a position measuring apparatus including only an electrode, a pen, and a position measuring method.

According to an aspect of the present disclosure, a position measuring apparatus that measures a position of a pen may include one or more electrodes, and a control unit that controls to transmit an electric field transmission signal generated from one or more electrodes to the pen, and receives an electric field reception signal corresponding to the electric field transmission signal.

According to an aspect of the present disclosure, a pen that displays a position on a position measuring apparatus may include a conductive tip that receives an electric field transmission signal generated from one or more electrodes of the position measuring apparatus, and a resonance circuit that generates an electric field reception signal corresponding to the electric field transmission signal.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
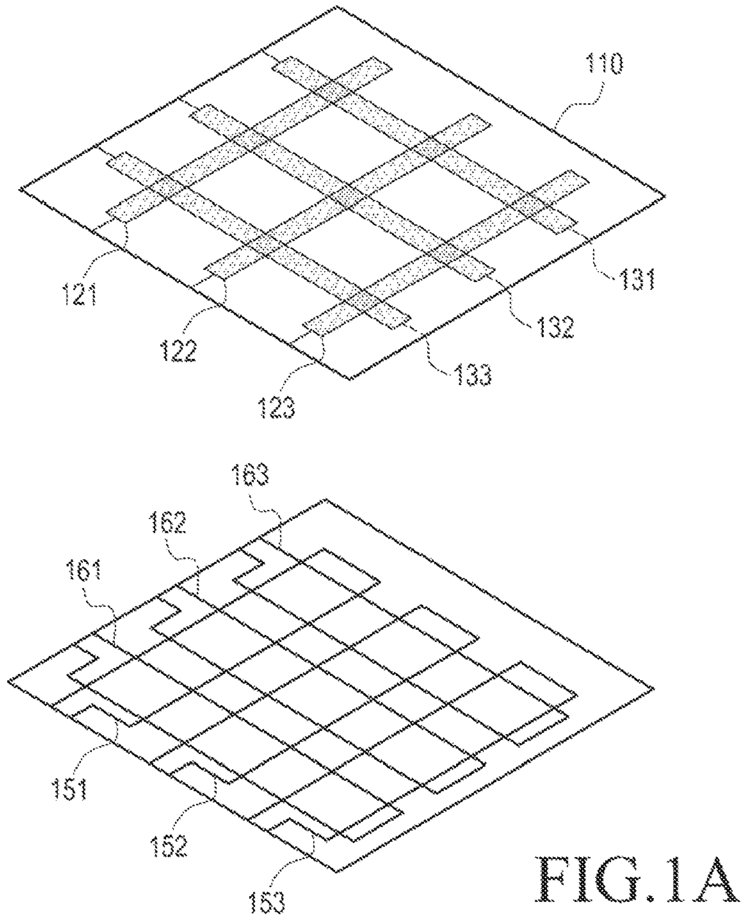
FIGS. 1A to 1C illustrate configurations of a comparison embodiment for comparing with the present disclosure.

Hereinafter, an embodiment of the present disclosure will be described in more detail with reference to the accompanying drawings. It should be noted that the same components of the drawings are designated by the same reference numeral anywhere. In the following description of the present disclosure, a detailed description of known functions and configurations incorporated herein will be omitted when it may make the subject matter of the present disclosure rather unclear.

FIG. 1A illustrates a configuration of a comparison embodiment for comparing with the present disclosure.

As shown in FIG. 1A, a position measuring apparatus for measuring a position of a pen according to the comparison embodiment includes an electrode unit 110 and a coil unit 140. The electrode unit 110 includes one or more electrodes 121, 122, 123, 131, 132 and 133. The coil unit 140 includes one or more coils 151, 152, 153, 161, 162 and 163. Here, the electrode unit 110 is for measuring a position of a finger of a user, and the coil unit 140 is for measuring the position of the pen.

As shown in FIG. 1A, the electrode unit 110 may include electrodes 131, 132 and 133 extending in an x-axis direction for measuring a y-axis coordinate of the finger and electrodes 121, 122 and 123 extending in a y-axis direction for measuring an x-axis coordinate of the finger. The extension in the x-axis direction may mean that the length of an electrode in the x-axis direction is longer than that of the electrode in the y-axis direction. The extension in the y-axis direction may mean that the length of the electrode in the y-axis direction is longer than that of the electrode in the x-axis direction.

One electrode of the electrode unit 110 has a predetermined capacitance. When a user touches one point using a finger, the predetermined capacitance of the electrode unit may be changed. The position measuring apparatus by the comparison embodiment may measure the position of the finger of the user based on the changed capacitance.

As shown in FIG. 1A, the coil unit 140 may include coils 161, 162 and 163 extending in an x-axis direction for measuring a y-axis coordinate of a pen and coils 151, 152 and 153 extending in a y-axis direction for measuring an x-axis coordinate of the pen. Here, the extension in the x-axis direction may mean that a length of a coil in the x-axis direction is longer than that of the coil in the y-axis direction.

The extension in the y-axis direction may mean that the length of the coil in the y-axis direction is longer than that of the coil in the x-axis direction.

Figure 1B:
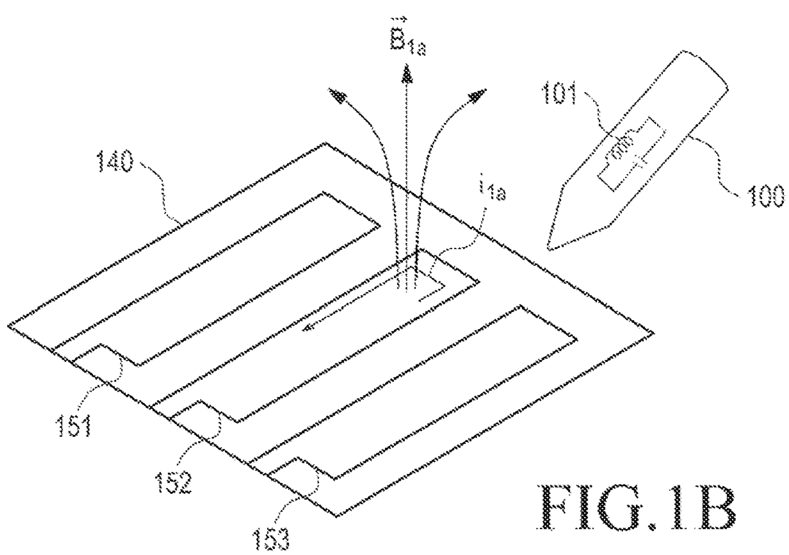
Figure 1C:
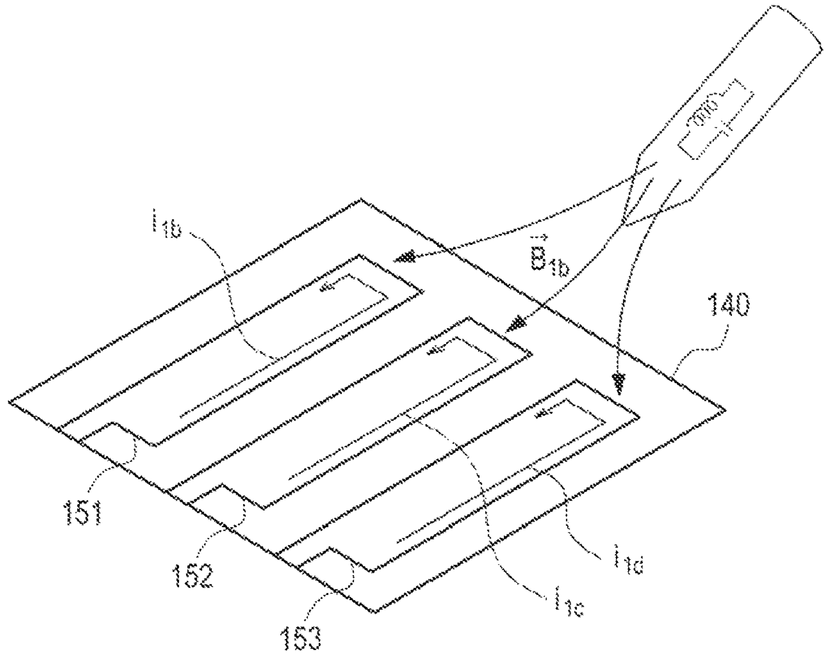

As shown in FIG. 1B, the position measuring apparatus by the comparison embodiment may apply a current i1*a* to the second coil 152. The second coil 152 may form an induced magnetic field B1*a*. A pen 100 by the comparison embodiment may include a resonance circuit 101. The resonance circuit 101 may generate a resonance by the induced magnetic field B1*a*. An electromagnetic wave may be generated by the generated resonance. As shown in FIG. 1C, the resonance circuit 101 of the pen 100 by the comparison embodiment may output a magnetic field B1*b*.

The first coil 151 may generate an induced electromotive current i1*b* by the magnetic field B1*b* output from the pen 100. An intensity of the magnetic field B1*b* output from the pen 100 may be reduced in inverse proportion to a square of a distance from a generation point. When the intensity of the magnetic field B1*b* output from the pen 100 is P and a distance from the pen 100 to the first coil 151 is r1, the intensity of the magnetic field B1*b* at the first coil 151 is $P/r1^2$. In addition, the induced electromotive current i1*b* at the first coil 151 may be in proportion to $P/r1^2$ which is the intensity of the magnetic field B1*b* at the first coil 151. When the intensity of the magnetic field B1*b* output from the pen 100 is P and a distance from the pen 100 to the second coil 152 is r2, the intensity of the magnetic field B1*b* at the second coil 152 is $P/r2^2$. In addition, an induced electromotive current i1*c* at the second coil 152 may be in proportion to $P/r2^{2\prime}$ which is the intensity of the magnetic field B1*b* at the second coil 152. When the intensity of the magnetic field B1*b* output from the pen 100 is P and a distance from the pen 100 to the third coil 153 is r3, the intensity of the magnetic field B1*b* at the third coil 153 is $P/r3^2$. In addition, an induced electromotive current i1*d* at the third coil 153 may be in proportion to $P/r3^2$ which is the intensity of the magnetic field B1*b* at the third coil 153. Therefore, the closer the distance between the pen and the coil is, the larger the formed induced electromotive current is. The position measuring apparatus by the comparison embodiment may measure the position of the pen 100 using intensities of induced electromotive currents at each coil.

The position measuring apparatus by the comparison embodiment may determine whether a type of a touched object is a pen or a finger. For example, when a change of a capacitance at the electrode unit 110 is detected, the position measuring apparatus by the comparison embodiment may determine that the finger is touched and determine a position of the finger. In addition, when an induced electromotive current is detected at the coil unit 140, the position measuring apparatus may determine that the pen is touched and may determine the position of the pen.

As described above, the position measuring apparatus by the comparison embodiment should include both of the electrode unit 110 for determining the position of the finger and the coil unit 140 for measuring the position of the pen. Therefore, the whole thickness of the position measuring apparatus is increased. In addition, the position measuring apparatus may have problems, such as an increase of the calculation amount of a driving algorithm and an increase of a driving power, because both of the electrode unit 110 and the coil unit 140 should be driven. Specially, the manufacturing cost of a whole position measuring apparatus may increase according to a manufacturing cost of the coil.

Figure 2A:
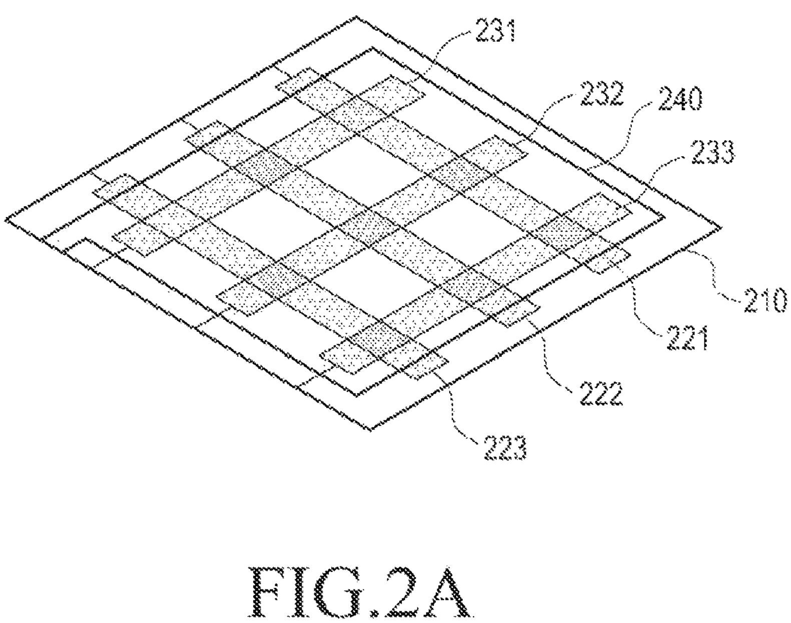
FIGS. 2A to 2C illustrate panels of a position measuring apparatus that measures positions of a finger and a pen by the comparison embodiment for comparing with the present disclosure.

FIG. 2A illustrates a panel 210 of a position measuring apparatus for measuring the positions of a pen and a finger by a comparison embodiment for comparing with the present disclosure.

As shown in FIG. 2A, the panel 210 of the position measuring apparatus for measuring the positions of the pen and the finger by the comparison embodiment includes an electrode unit and a coil 240. The electrode unit includes one or more electrodes 221, 222, 223, 231, 232 and 233. Here, the electrode unit is for measuring the positions of the finger of a user and the pen, and the coil 240 is for measuring the position of the pen. The electrode unit and the coil 240 may be formed on the same substrate.

As shown in FIG. 2A, the electrode unit may include electrodes 231, 232 and 233 extending in an x-axis direction for measuring a y-axis coordinate of the finger and electrodes 221, 222, and 223 extending in a y-axis direction for measuring an x-axis coordinate of the finger. The extension in the x-axis direction may mean that the length of an electrode in the x-axis direction is longer than that of the electrode in the y-axis direction. The extension in the y-axis direction may mean that the length of the electrode in the y-axis direction is longer than that of the electrode in the x-axis direction. Meanwhile, a configuration for determining the position of the finger of the user is described with reference to FIG. 1A, and thus further descriptions concerning the configuration for determining the position of the finger of the user will be omitted.

As shown in FIG. 2A, the coil 240 may be formed of one pattern. That is, the coil 240 may be formed of one pattern in a whole panel 210 on the contrary to the forming of the plurality of coils corresponding to each channel in the comparison embodiment of FIG. 1A.

Figure 2B:
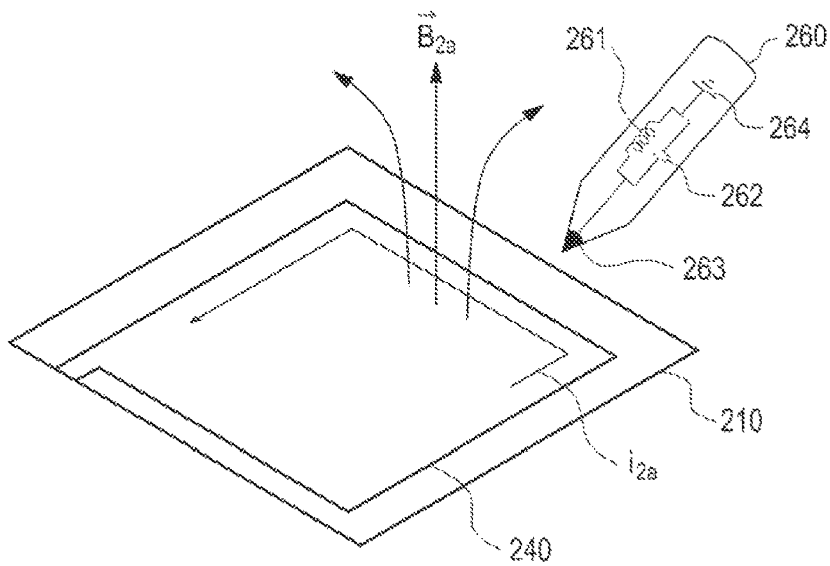
Figure 2C:
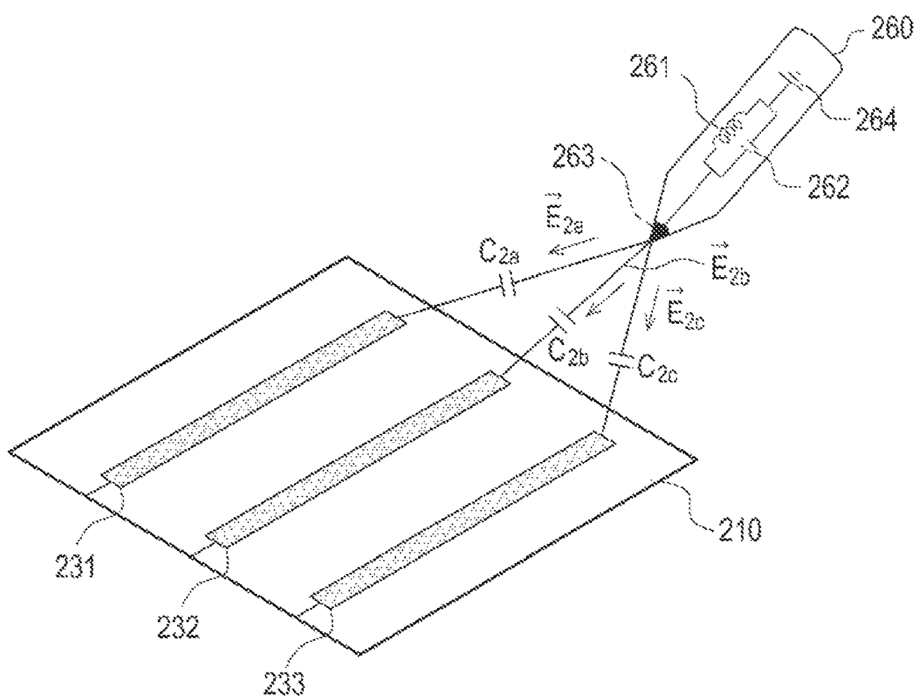

As shown in FIG. 2B, the position measuring apparatus by the comparison embodiment may apply a current i2*a* to the coil 240. In the FIG. 2B, for a convenience of description, an illustration of the electrode unit is omitted. The coil 240 may form an induced magnetic field B2*a*. A pen 260 by the comparison embodiment may include a resonance circuit 261 and 262. The resonance circuit 261 and 262 may generate a resonance by the induced magnetic field B2*a*. An electromagnetic wave may be generated by the generated resonance. As shown in FIG. 2C, the resonance circuit 261 and 262 of the pen 260 by the comparison embodiment may output electric fields E2*a*, E2*b* and E2*c*. In FIG. 2B, for a convenience of description, illustrations of the electrodes 241 to 243 and the coil 240 are omitted. The resonance circuit 261 and 262 of the pen 260 by the comparison embodiment may be connected to a ground 264.

A conductive tip 263 of the pen 260 by the comparison embodiment may form a first capacitance C2*a* with the first electrode 231. The conductive tip 263 of the first electrode 231 and the pen 260 may form a capacitive coupling. The conductive tip 263 of the pen 260 may form a second capacitance C2*b* with the second electrode 232. The conductive tip 263 of the pen 260 may form a third capacitance C3*b* with the third electrode 233. A capacitance may be inverse proportion to a distance between two conductors of a capacitor. Thus, the first to third capacitances C2*a*, C2*b* and C2*c* may be different. In addition, each size of each electric fields E2*a*, E2*b* and E2*c* transferred through the first to third capacitances C2*a*, C2*b* and C2*c* are different.

The electrode 231, 232 and 233 may output currents corresponding to the transferred electric fields E2*a*, E2*b* and E2*c*, respectively. Since each size of the transferred electric fields E2*a*, E2*b* and E2*c* is different, the currents output from the electrodes 231, 232 and 233 may be also different. The position measuring apparatus by the comparison embodiment determines the position of the pen based on the currents from each of the electrodes 231, 232 and 233.

More specifically, the first electrode 231 may generate the current by the electric field E2*a* output from the pen 260. An intensity of the electric field E2*a* output from the pen 260 may be reduced in inverse proportion to a square of a distance from a generation point. When the intensity of the electric field E2*a* output from the pen 260 is Q and a distance from the pen 260 to the first electrode 231 is r1, the intensity of the electric field E2*a* at the first electrode 231 is $Q/r1^2$. In addition, the current at the first electrode 231 may be in proportion to $Q/r1^2$ which is the intensity of the electric field E2*a* at the first electrode. When the intensity of the electric field E2*a* output from the pen 260 is Q and a distance from the pen 260 to the second electrode 232 is r2, the intensity of the electric field E2*a* at the second electrode 232 is $Q/r2^2$. In addition, the current at the second electrode 232 may be in proportion to $Q/r2^2$, which is the intensity of the electric field E2*a* at the second electrode. When the intensity of the electric field E2*a* output from the pen 260 is Q and the distance from the pen 260 to the third electrode 233 is r3, the intensity of the electric field E2*a* at the third electrode 233 is $Q/r3^2$. In addition, the current at the third electrode 233 may be in proportion to $Q/r3^2$, which is the intensity of the electric field E2*a* at the third electrode. Therefore, the closer the distance between the pen and the electrode is, the larger the output current is. The position measuring apparatus by the comparison embodiment may measure the position of the pen using intensities of currents from each electrodes 231, 232 and 233.

The position measuring apparatus by the comparison embodiment may determine whether a type of a touched object is a pen or a finger. For example, when a change of the capacitance at the electrode unit is detected, the position measuring apparatus by the comparison embodiment may determine that the finger is touched and determine the position of the finger. In addition, when a current from the electrode unit is detected, the position measuring apparatus may determine that the pen is touched and determine a position of the pen.

Figure 3:
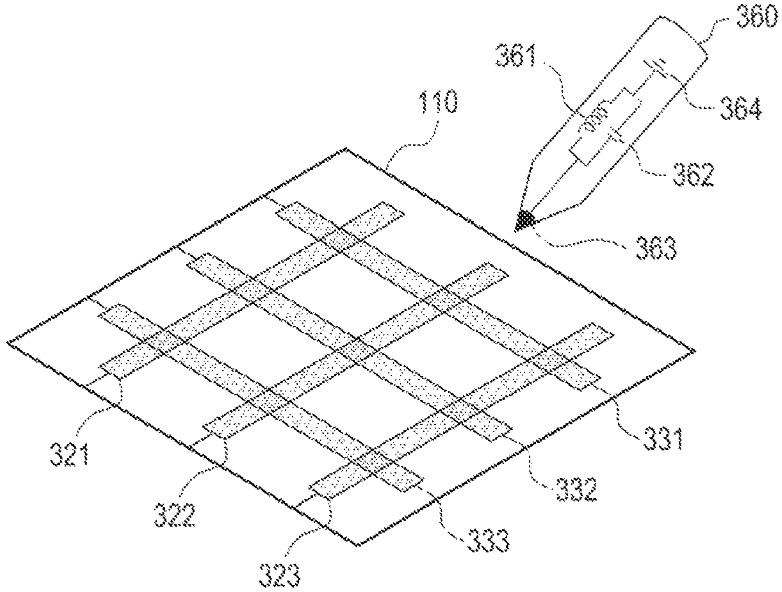
FIG. 3 illustrates a panel of a position measuring apparatus capable of determining a position of a pen according to various embodiments of the present disclosure.

FIG. 3 illustrates a panel of a position measuring apparatus capable of determining a position of a pen according to various embodiments of the present disclosure. The position measuring apparatus may measure a touched position or a proximity position of a touched object such as a pen or a finger. In addition, the position measuring apparatus may further measure a pen pressure of a pen, button on and off states and the like, and these are described in more detail later.

As shown in FIG. 3, the panel of the position measuring apparatus according to various embodiments of the present disclosure includes an electrode unit including one or more electrodes 321, 322, 323, 331, 332 and 333. On the contrary to the comparison embodiments of FIGS. 1A and 2B, the position measuring apparatus by an embodiment of FIG. 3 may not include a coil. Meanwhile, a pen 360 by various embodiments of the present disclosure may include a resonance circuit 361 and 362, a conductive tip 363 and a ground 363.

Figure 4A:
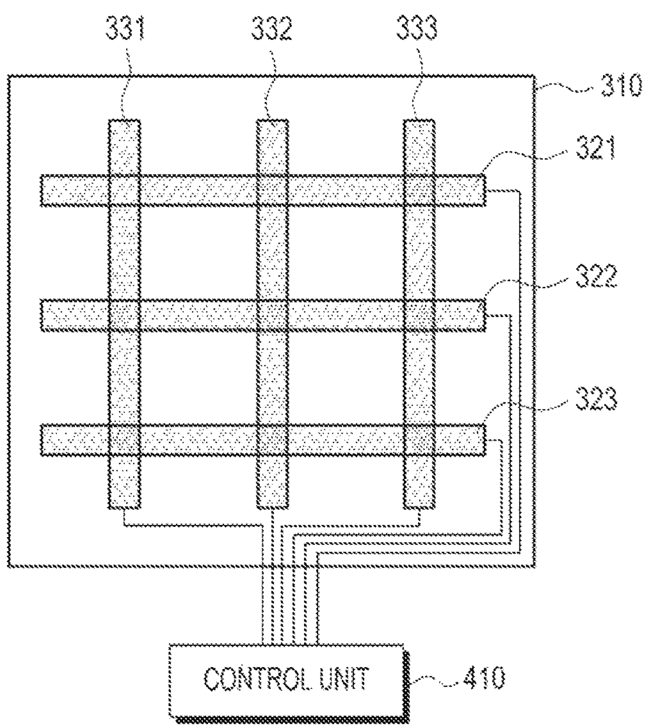
FIGS. 4A and 4B illustrate plan views of an electrode arrangement of a position measuring apparatus according to various embodiments of the present disclosure.

FIG. 4A illustrates a plan view of an electrode arrangement of a position measuring apparatus according to various embodiments of the present disclosure.

As shown in FIG. 4A, the position measuring apparatus may include electrodes 321, 322 and 323 extending in an x-axis direction for measuring a y-axis coordinate of a pen and electrodes 331, 332, and 333 extending in a y-axis direction for measuring an x-axis coordinate of the pen. The extension in the x-axis direction may mean that the length of an electrode in the x-axis direction is longer than that of the electrode in the y-axis direction. The extension in the y-axis direction may mean that the length of the electrode in the y-axis direction is longer than that of the electrode in the x-axis direction. The electrodes may be connected to a control unit 410 of the position measuring apparatus.

Figure 4B:
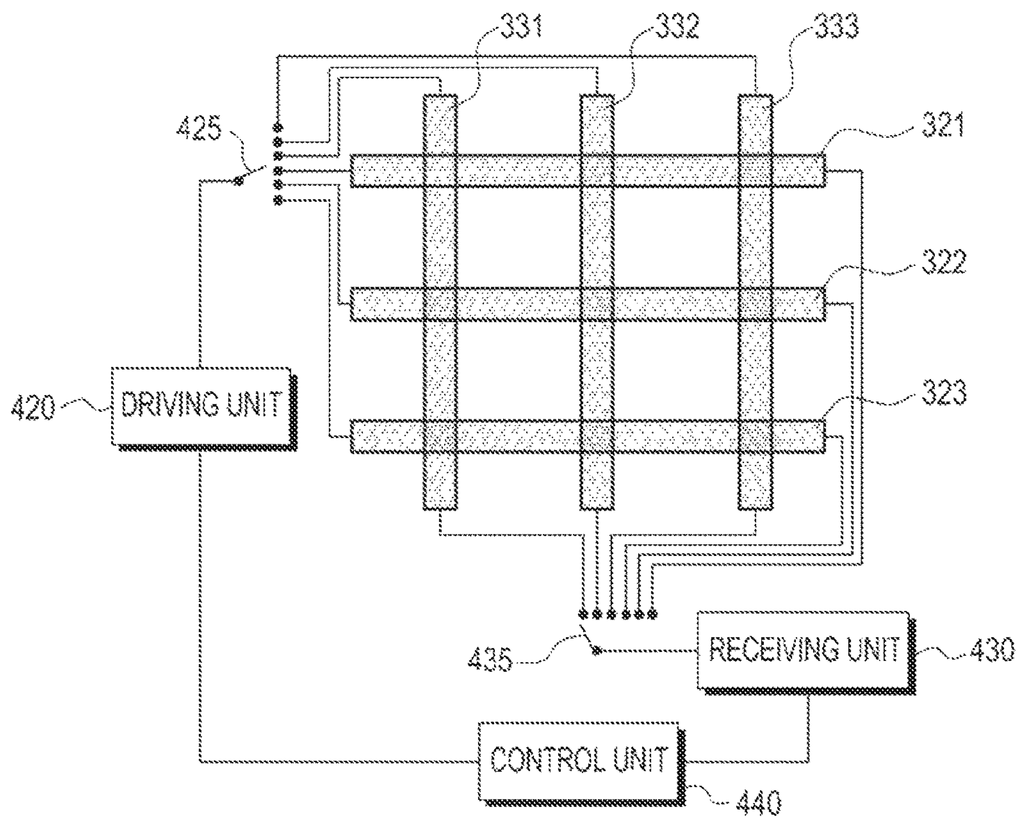

As shown in FIG. 4B, the electrodes 321, 322, 323, 331, 332 and 333 may be connected to a driving unit. The electrodes may be connected to the driving unit 420 through a switch 425. The control unit 410 may apply a current to the 321, 322, 323, 331, 332 and 333 by controlling the driving unit 420. The control unit 410 may control the switch 425 connected to the driving unit 420 such that the switch 425 is connected to the electrodes 321, 322, 323, 331, 332, and 333. The electrode connected to the driving unit 420 may be referred to as a driving electrode. The driving electrode may receive a current, which is a driving signal, from the driving unit 420. The driving electrode may generate an electric field based on the driving signal.

The electrodes 321, 322, 323, 331, 332 and 333 may be connected to a receiving unit 430. The electrodes 321, 322, 323, 331, 332 and 333 may be connected to the receiving unit 430 through a switch 435. The control unit 410 controls the switch 435 such that the receiving unit 430 is connected to the electrodes 321, 322, 323, 331, 332 and 333. The receiving unit 430 may process a signal received from the connected electrode, and the control unit 410 may measure a position of the pen 460 using the processed signal. The electrodes 321, 322, 323, 331, 332 and 333 may receive the electric field, that is a received signal, output from the pen 460. The electrodes 321, 322, 323, 331, 332 and 333 may output a current corresponding to the received electric field, and the receiving unit 430 may process the output current and transfer the processed current to the control unit 410.

Figure 5A:
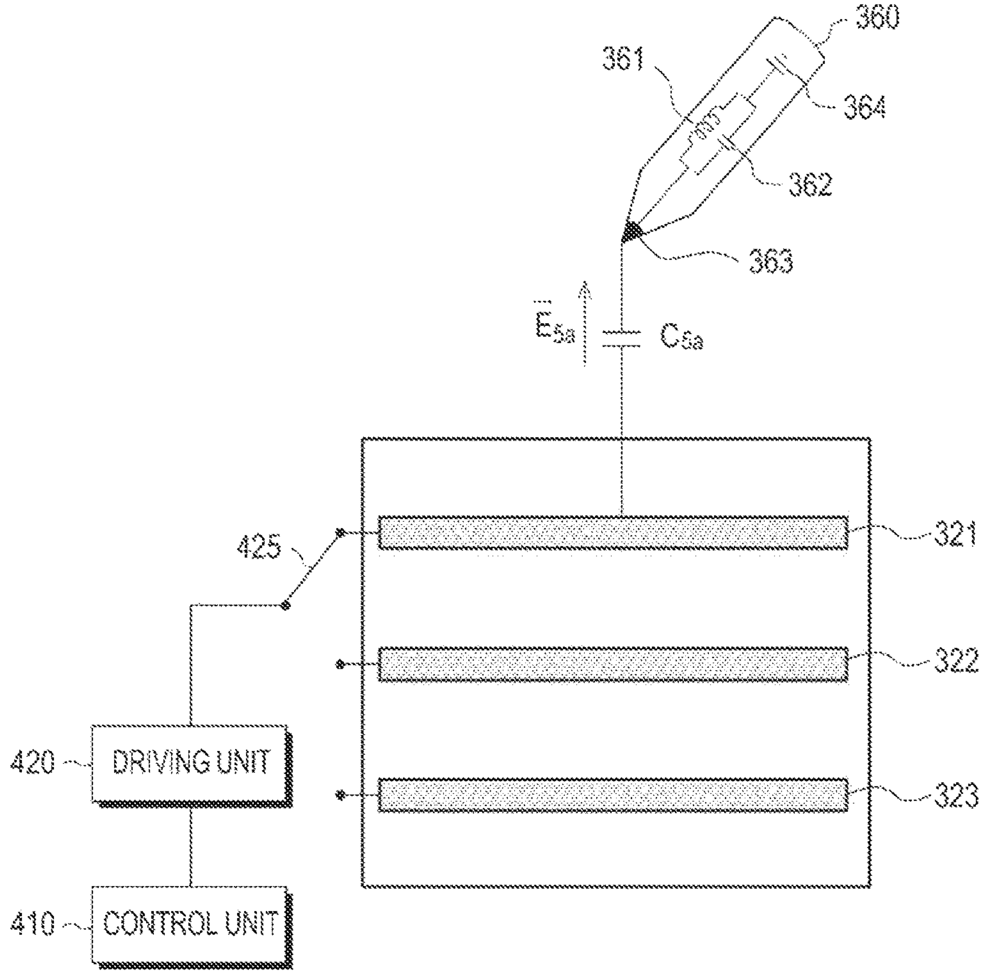
FIGS. 5A to 5D illustrate conceptual diagrams of a pen position measurement of a position measuring apparatus according to various embodiments of the present disclosure.

FIG. 5A illustrates a conceptual diagram of a pen position measurement of a position measuring apparatus according to various embodiments of the present disclosure.

As shown in FIG. 5A, the control unit 410 may apply a driving signal to a driving electrode 321 by controlling a switch 425 and a driving unit 420. Meanwhile, the driving electrode 321 may form a capacitance C5*a* with a conductive tip 363 of a pen 360. The driving electrode 321 may include a conductive material, and thus the driving electrode 321 may form the capacitance C5*a* with the conductive tip 363. That is, the driving electrode 321 may form a capacitive coupling with the conductive tip 363. The driving electrode 321 may transmit a transmission signal of an electric field E5*a* to the pen 360 based on the driving signal from the driving unit 420. For example, the driving unit 420 may output a driving signal 701 to 706 as shown in (a) of FIG. 7 to the driving electrode 321. The driving unit 420 may output the driving signal 701 to 706 during a first period, and may not output the driving signal during a second period 711 to 715. More specifically, the driving unit 420 may output the driving signal 701 to 706 during a driving period T1, that is the first period, and may not output the driving signal during a non-driving period T2, that is the second period 711 to 715. The driving unit 420 may repeat a driving signal control of the driving period and the non-driving period. Alternatively, the control unit 410 may control the switch 325 such that the driving unit 420 is connected to the driving electrode 321 during the first period and is not connected to the driving electrode 321 during the second period.

Figure 5B:
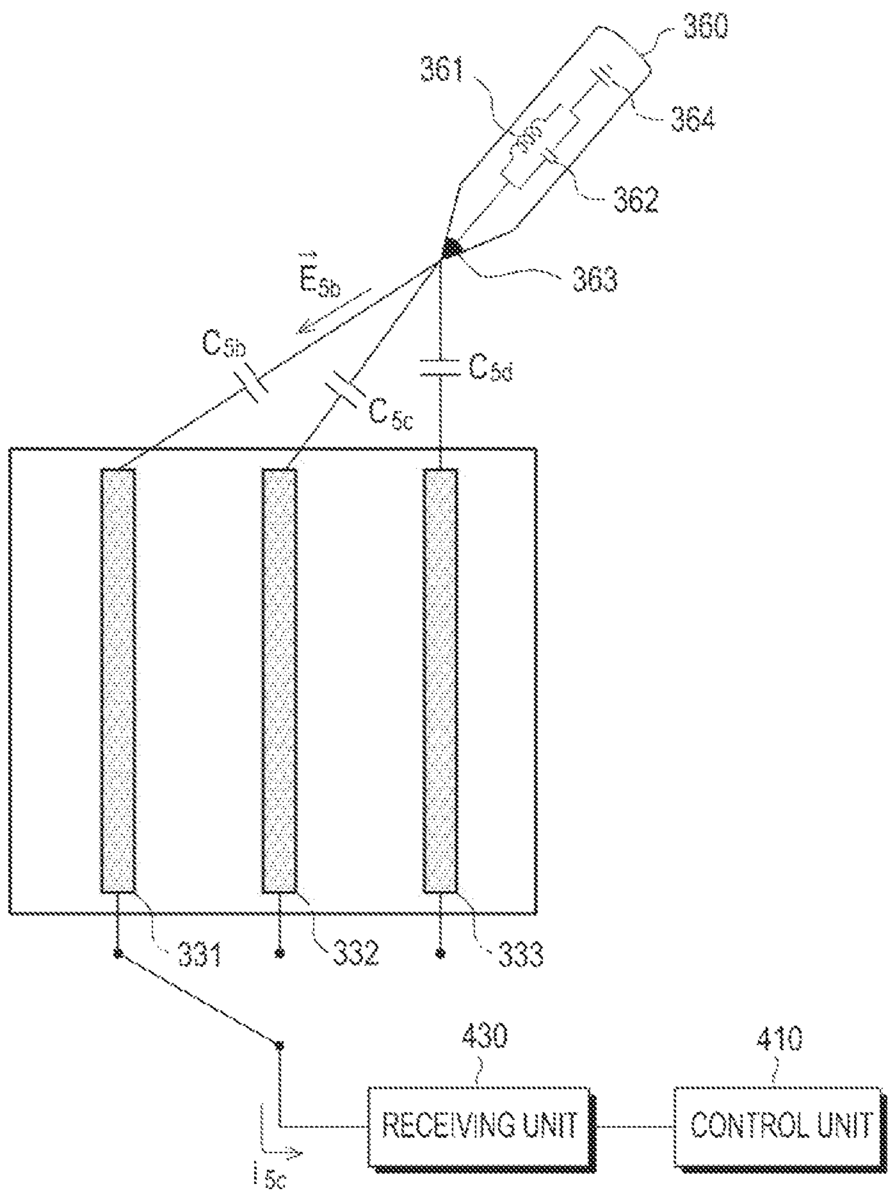

As shown in FIG. 5B, the conductive tip 363 of the pen 360 may form a capacitance C5*b* with the fourth electrode 331. The conductive tip 363 may form a capacitance C5c with the fifth electrode 332, and may form a capacitance C5d with the sixth electrode 333. When the driving electrode 321 transmits the electric field E5a by the driving signal 701, the resonance circuit 361 and 362 of the pen 360 may generate a resonance. For example, the resonance circuit 361 and 362 of the pen 360 may generate a resonance 721 as shown in (b) of FIG. 7. (b) of FIG. 7 may show an electromagnetic wave, for example an electric field, by the resonance. As shown in (b) of FIG. 7, the electric field may be an alternating current form having a resonance frequency. An amplitude of the electric field may be increased during the period when the driving signal is applied, that is the first period. In addition, the amplitude of the electric field may be reduced during the period when the driving signal is not applied, that is the second period. The electric field by the resonance may be applied to the fourth electrode 331 during a first 711 of the second period. The fourth electrode 331 may output a current i5b corresponding to a received signal E5b. The receiving unit 430 may receive the current i5b and transfer the current i5b to the control unit 410. The control unit 410 may measure the position of the pen 360 using the received current i5b. A received signal 731 shown in (c) may be delayed by x2 compared to the driving signal 701, and thus the received signal 731 may be received during the non-driving period T2, that is the second period 711.

Figure 5C:
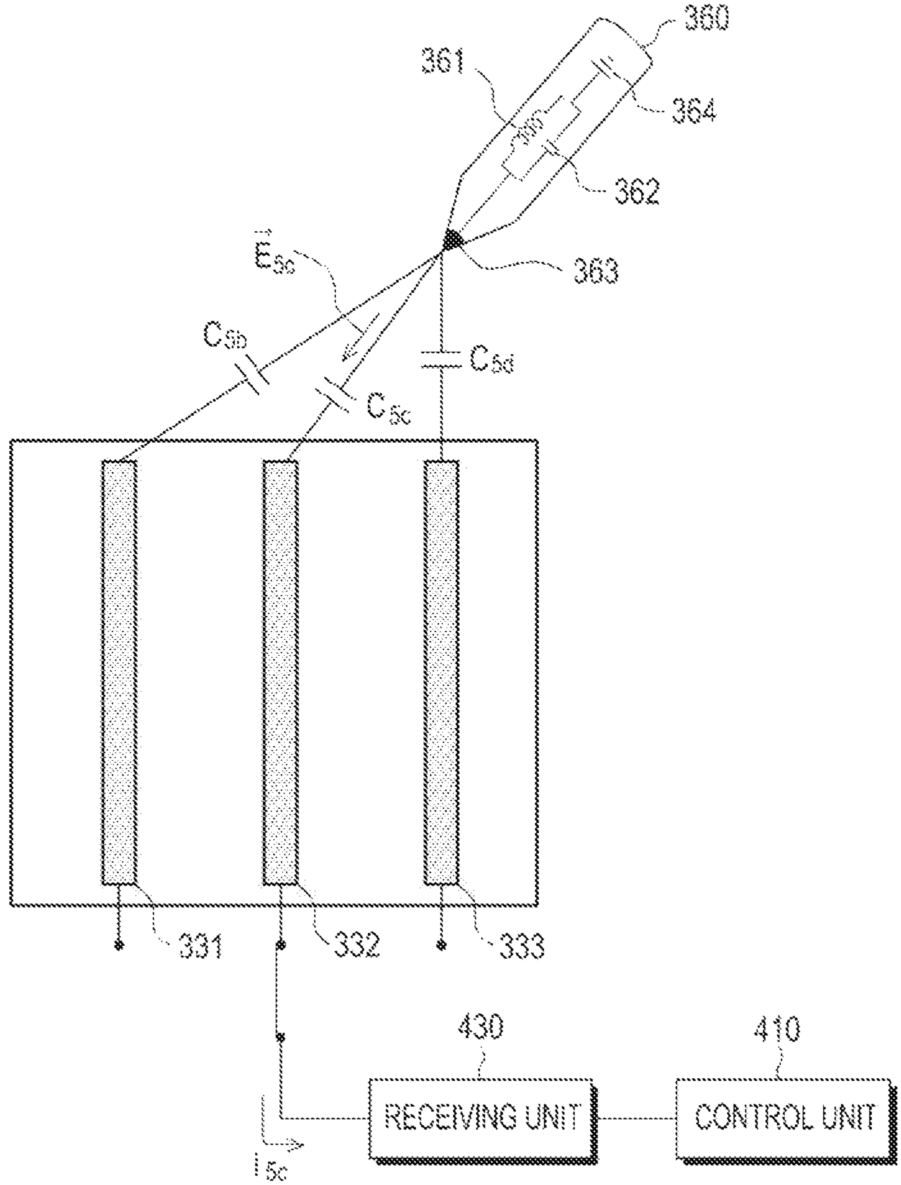

As shown in FIG. 5C, the conductive tip 363 of the pen 360 may form a capacitance C5c with the fifth electrode 332. When the driving electrode 321 transmits an electric field E5a by a driving signal 702, the resonance circuit 361 and 362 of the pen 360 may generate a resonance 722. The electric field by the resonance may be applied to the fifth electrode 332 as a received signal E5c like a second waveform 732 shown in (c) of FIG. 7. For example, the pen 360 may be more adjacent to the fifth electrode 332 compared to the fourth electrode 331. Thus, the second waveform 732 may have an amplitude higher than that of the first waveform 731. The fifth electrode 332 may output a current i5c corresponding to the received signal E5b. The receiving unit 430 may receive the current i5c and transfer the current i5c to the control unit 410. The control unit 410 may measure the position of the pen 360 using the received current i5c.

Figure 5D:
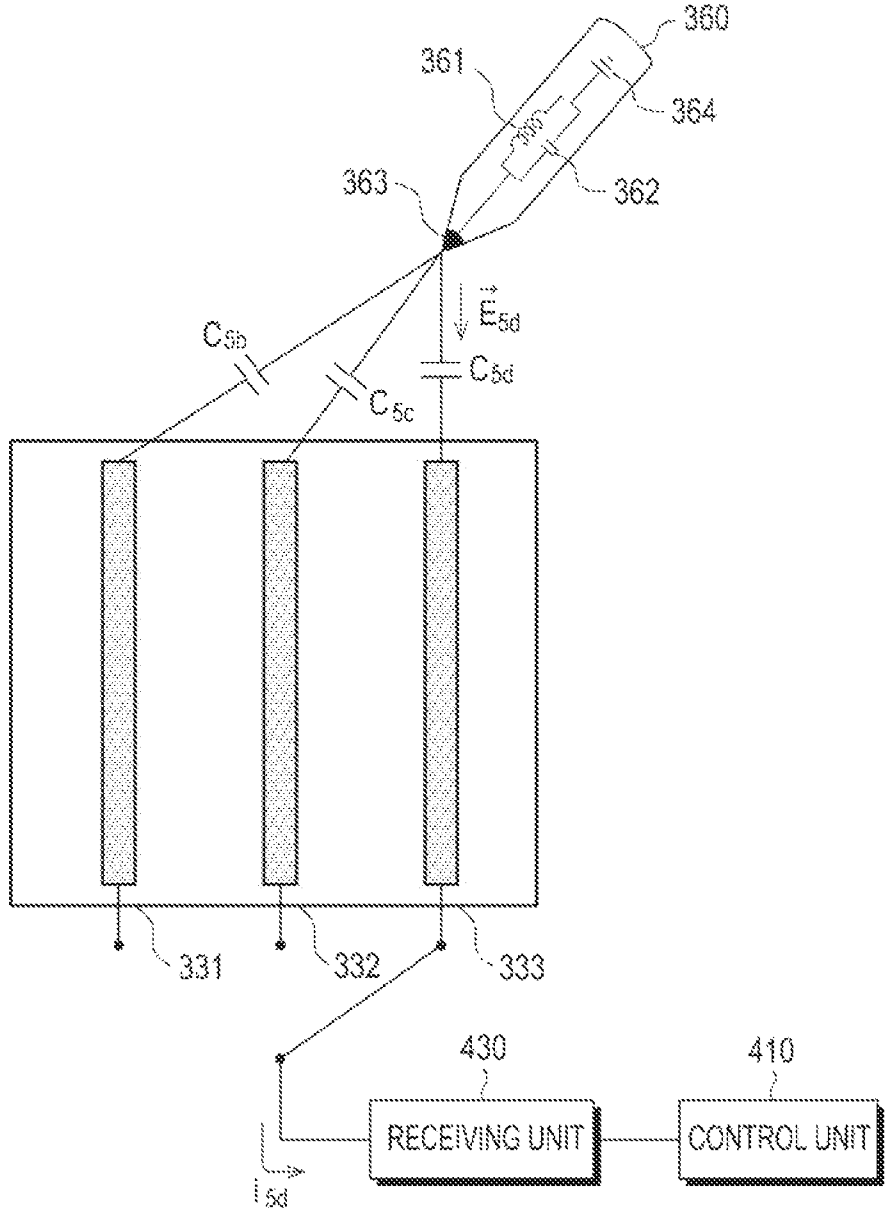

As shown in FIG. 5D, the conductive tip 363 of the pen 360 may form a capacitance C5d with the sixth electrode 333. When the driving electrode 321 transmits an electric field E5a by a driving signal 703, the resonance circuit 361 and 362 of the pen 360 may generate a resonance 723. The electric field by the resonance may be applied to the sixth electrode 333 as a received signal E5c like a third waveform 733 shown in (c) of FIG. 7. For example, the pen 360 may be more adjacent to the sixth electrode 333 compared to the fifth electrode 332. Thus, the third waveform 733 may have an amplitude higher than that of the second waveform 732. The sixth electrode 333 may output a current i5d corresponding to the received signal E5d. The receiving unit 430 may receive the current i5d and transfer the current i5d to the control unit 410. The control unit 410 may measure the position of the pen 360 using the received current i5d.

The control unit may determine the position of the pen 360 using the currents i5b to i5d received from each of the fourth to sixth electrodes 331 to 333. For example, the control unit 410 may determine an electrode of which a received current is highest as the position of the pen. Alternatively, the control unit may apply an interpolation to the received current to determine the position of the pen based on the application result. Meanwhile, in the above, a configuration in which the control unit 410 measures an x-axis position of the pen 360 is described, but it may be easily understood that this may be identically applied to a measurement of a y-axis position to a person having an ordinary skill in the art. In this case, one of the electrodes 331 to 333 for measuring the x-axis position may be set as the driving electrode.

According to the description above, the position measuring apparatus according to various embodiments of the present disclosure can determine the position of the pen using only an electrode without a coil. In addition, the position measuring apparatus can determine a touch position of a finger according to a capacitance change of an electrode when a user touches using a finger. Thus, the position measuring apparatus according to various embodiments of the present disclosure can measure input positions of the pen and the finger using a plurality of electrodes. Specially, as described above, when the pen is input, the position measuring apparatus may receive an alternating current waveform signal of an electric field form. When the finger touches the position measuring apparatus, an alternating current waveform signal may not be received. Thus, the position measuring apparatus can determine whether the pen is touched or the finger is touched according to whether a received current includes an alternating current waveform. Determining a type of a touched object will be described in more detail later.

Figure 6:
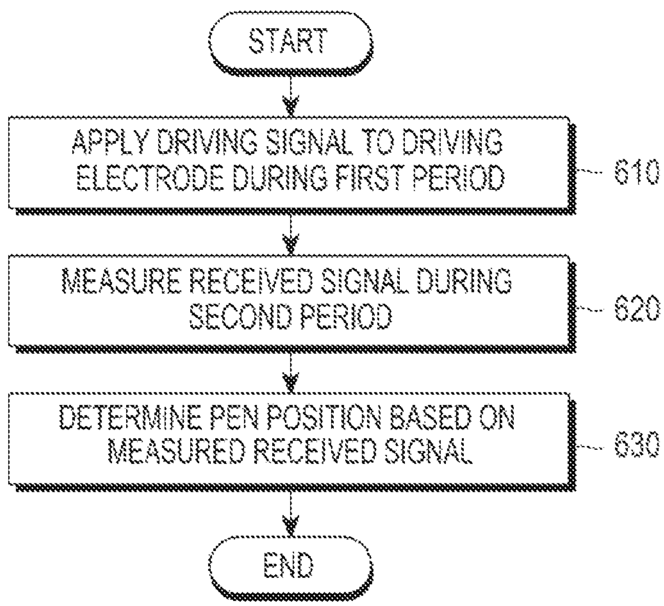
FIG. 6 illustrates a flowchart of a control method of a position measuring apparatus according to various embodiments of the present disclosure.
Figure 7:
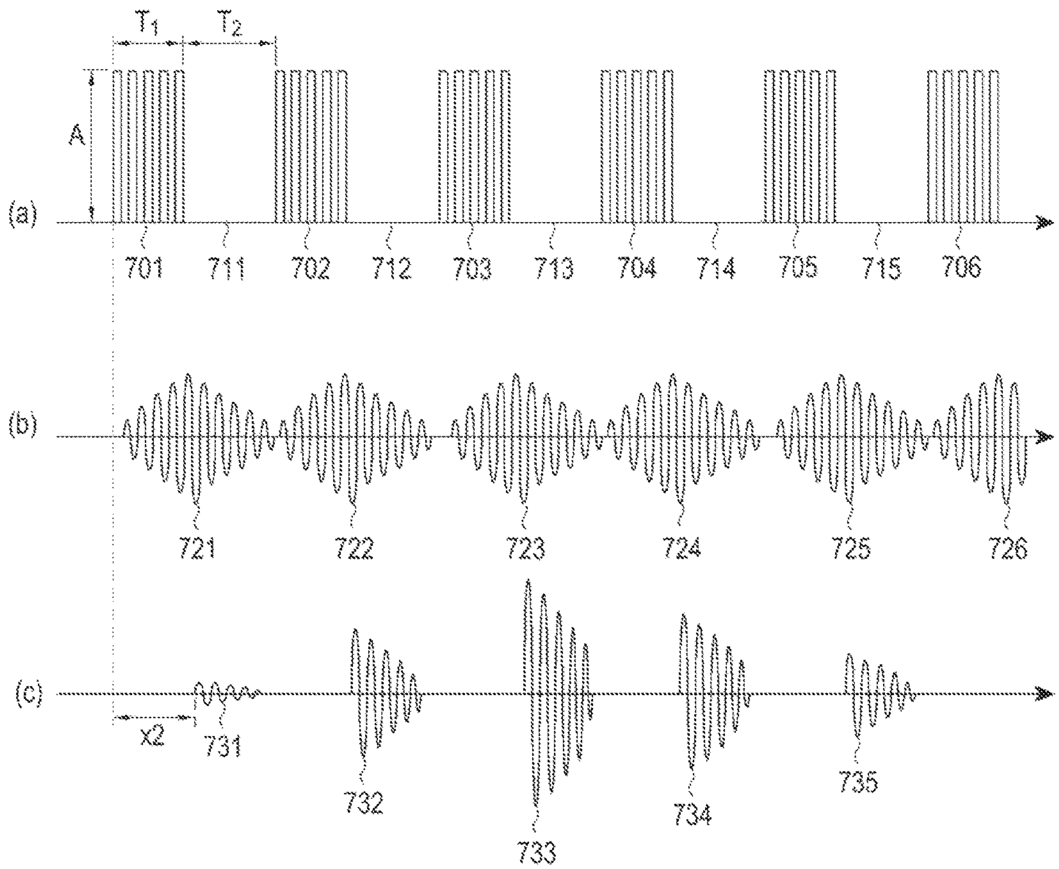
FIG. 7 illustrates waveforms of a signal generated or measured by various embodiments of the present disclosure.

FIG. 6 illustrates a flowchart of a control method of a position measuring apparatus according to various embodiments of the present disclosure. The embodiment of FIG. 6 will be described in more detail with reference to FIG. 7. FIG. 7 illustrates waveforms of a signal generated or measured by various embodiments of the present disclosure.

The position measuring apparatus may apply a driving signal to a driving electrode during the first period 701, 702, 703, 704, 705 and 706. For example, as shown in (a) of FIG. 7, the driving signal may be applied during the first period 701, 702, 703, 704, 705 and 706, that is a period T1. A driving electrode may transmit a transmission signal, for example an electric field, to the pen by the driving signal. In one embodiment, the driving electrode may transmit the electric field to the pen through a capacitive coupling formed between the driving electrode and a conductive tip of the pen. The driving signal is illustrated as a form of a square wave having an amplitude A during the period T1, but this is a simple example, and a waveform of the driving signal is not limited.

The position measuring apparatus may measure a received signal at the electrode during the second period 711, 712, 713, 714 and 715. For example, the pen may generate the resonances 721, 722, 723, 724, 725 and 726 like (b) of FIG. 7. More specifically, when the driving electrode transmits a transmission signal during the first period 701, the pen may generate a first resonance 721 corresponding to the transmission signal. As shown in (a) of FIG. 7, since the driving signal is applied during a first of the first period 701 and is not applied during a first of the second period 711, the first resonance 721 may have a waveform of which an amplitude increases and then decreases.

As shown in FIG. 7, a signal waveform of the resonance shown in (b) may be delayed by x1 compared to the driving signal shown in (a). In addition, the signal wave of the resonance may be applied to the position measuring apparatus like a waveform shown in (c) of FIG. 7. That is, the position measuring apparatus may receive received signals 731, 732, 733, 734 and 735 from the pen. For example, a first received signal 731 may be received from an electrode of a first channel of the position measuring apparatus, and second to fifth received signals 732 to 735 may be received from second to fifth channels, respectively. As described above, the closer a distance between the electrode and the pen is, the stronger an intensity of the received signal is. In the embodiment of FIG. 7, it is assumed that the pen is disposed adjacently to the third channel. Thus, as shown in (c) of FIG. 7, a size of the received signal 733 received from the third channel may be larger than that of other received signals 731, 732, 734 and 735. The position measuring apparatus may determine the position of the pen based on received signals from electrodes corresponding to each channel. For example, the position measuring apparatus may determine the position of the pen based on the intensity of the received signal received from the electrode. The position measuring apparatus may determine the position of the pen based on a comparative intensity of the received signal received from the electrode.

In another embodiment, the position measuring apparatus may determine the position of the pen based on a capacitance of the electrode, which is changed by the touch of the pen. The position measuring apparatus may determine the position of the pen, and may determine whether the touched object is the pen or not based on the received signal. This will be described in detail later.

The individual waveforms shown in (c) of FIG. 7 may be received signals received from different electrode channels, respectively. Amplitudes of the individual waveforms shown in (c) of FIG. 7 may be different according to distances between the pen and each of the channels. Here, the received signal may be an electric field transferred through a capacitive coupling formed between each of the individual electrodes and the conductive tip of the pen. Meanwhile, the received signals 731, 732, 733, 734 and 735 may be delayed by x2 compared to the driving signal shown in (a). For example, the received signal may be received during the non-driving period T2, that is the second period 711, 712, 713, 714 and 715, and the position measuring apparatus may measure the received signal during the second period 711, 712, 713, 714 and 715, that is the non-driving period T2.

The position measuring apparatus may determine the position of the pen based on the received signal measured during the second period. For example, the position measuring apparatus may determine the position of the pen based on the intensity of the received signals corresponding to each electrode channel like (c) of FIG. 7. As described above, the closer a distance between the electrode and the pen is, the stronger an intensity of the received signal is. For example, in an embodiment of the FIG. 7, the position measuring apparatus may determine that pen is adjacent to an electrode corresponding to the third received signal 733.

Figure 8:
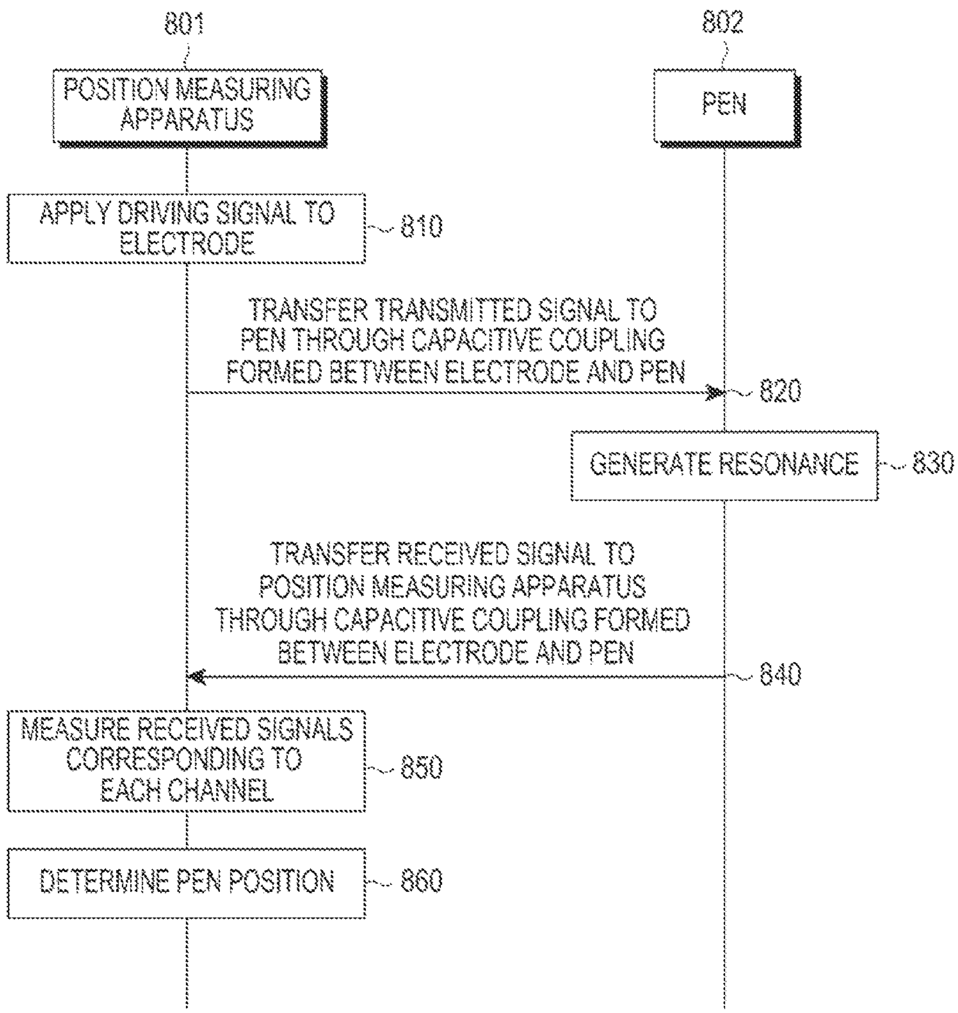
FIG. 8 illustrates a flowchart of a pen position measuring method according to various embodiments of the present disclosure.

FIG. 8 illustrates a flowchart of a pen position measuring method according to various embodiments of the present disclosure.

In step 810, a position measuring apparatus 801 may apply a driving signal to an electrode during a first period. The position measuring apparatus 801 may include a plurality of electrodes for measuring the pen position, and may apply the driving signal to a driving electrode among the plurality of electrodes. The position measuring apparatus 801 may determine a predetermined electrode as the driving electrode. Alternatively, the position measuring apparatus 801 may re-determine an electrode corresponding to the determined pen position as the driving electrode for measuring a position of a next pen, and this will be described in more detail later.

In step 820, the driving electrode may transfer a transmission signal to the pen 802 through a capacitive coupling formed between the driving electrode and the pen 802. The driving electrode may form an electric field based on an applied current and the transmission signal of an electric field form may be transferred to the pen 802.

In step 830, the pen 802 may generate a resonance based on the transferred transmission signal of the electric field form. The pen 802 may include a resonance circuit, and may generate the resonance based on the transferred transmission signal. Thus, the pen 802 may generate an electromagnetic wave.

In step 840, the pen 802 may transfer a received signal of an electric field form to the position measuring apparatus 801 through a capacitive coupling formed between each of the plurality of electrodes and the pen. In step 850, the position measuring apparatus 801 may measure the received signals at each electrode corresponding to each channel. The position measuring apparatus 801 may measure the received signals at each electrode corresponding to each channel during a second period, that is a non-driving period. More specifically, the position measuring apparatus 801 may measure a received signal at an electrode of a first channel during a first of the non-driving period, and may measure a received signal at an electrode of a second channel during a second of the non-driving period. The position measuring apparatus 801 may measure received signals which are received from all electrodes included therein.

In step 850, the position measuring apparatus 801 may determine the position of the pen based on the received signals which are received from the electrodes corresponding to each channel. The electrodes corresponding to each channel may generate currents based on the received signals, and the position measuring apparatus 801 may determine the position of the pen based on the currents generated from the electrodes corresponding to each channel. For example, the position measuring apparatus 801 may determine an electrode from which a current having a comparatively large size is generated as the position of the pen. The position measuring apparatus 801 may determine a y-axis position of the pen based on currents generated from electrodes extending in an x-axis direction and may determine an x-axis position of the pen based on currents generated from electrodes extending in a y-axis direction.

Figure 9:
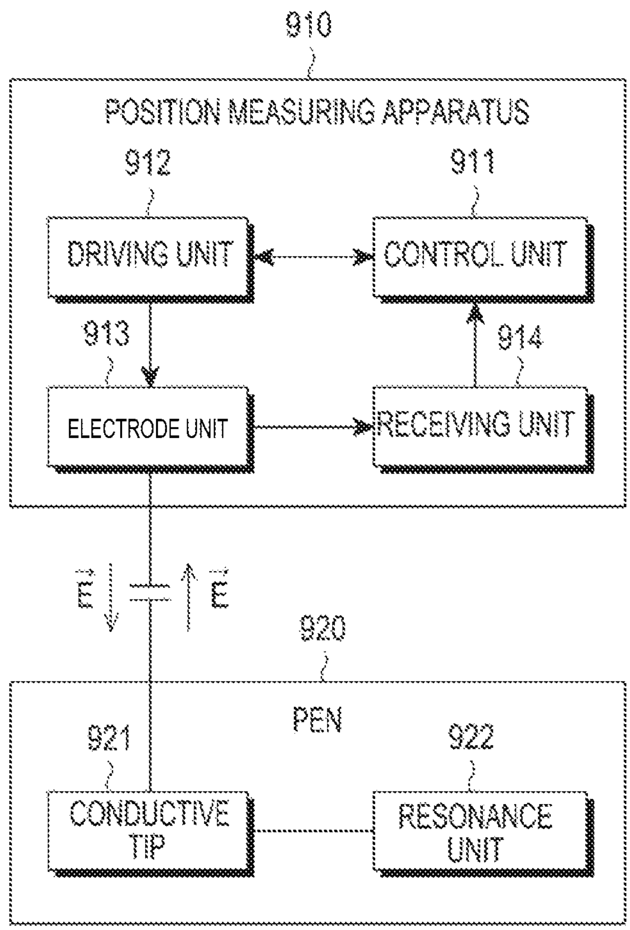
FIG. 9 illustrates a block diagram of a position measuring apparatus and a pen according to various embodiments of the present disclosure.

FIG. 9 illustrates a block diagram of a position measuring apparatus and a pen according to various embodiments of the present disclosure.

As shown in FIG. 9, a position measuring apparatus 910 may include a control unit 911, a driving unit 912, an electrode unit 913 and a receiving unit 914. In addition, a pen 920 may include a conductive tip 921 and a resonance unit 922.

The control unit 911 may control the driving unit 912 such that the driving unit 912 provides a driving signal during a first period. The control unit 911 may control the driving unit 912 such that the driving unit 912 is connected to a driving electrode of an electrode unit 913. The driving electrode may generate an electric field based on the driving signal transferred from the driving unit 912 during the first period. The driving electrode of the electrode unit 913 may form a capacitive coupling with a conductive tip 921 of the pen 920. The driving electrode may transmit a transmission signal of an electric field form to the pen 920 through a capacitive coupling.

The resonance unit 922 of the pen 920 may generate a resonance based on the transmission signal of the electric field form from the driving electrode. An electric field may be generated by the resonance, and the electric field, that is a received signal may be transferred through the capacitive coupling formed between the electrode of the electrode unit and the conductive tip 921.

The receiving unit 914 may process the received signals which are received from each electrode of the electrode unit and transmit the processed received signals to the control unit 911. The control unit 911 may control the receiving unit 914 and the driving unit 912 such that the receiving unit 914 is connected to the electrode unit 913 during a second period different from the first period and the driving unit 912 is not connected to the electrode unit 913 during the second period. That is, the control unit 911 may not apply the driving signal to the electrode unit during the second period. Each of electrodes of the electrode unit 913 may output currents to the receiving unit 914 based on the received signals. The receiving unit 914 may perform, for example, an amplification, a noise elimination, a digital conversion, a conversion into a signal on a frequency area and the like for the received signal or the currents, and these will be described in more detail later.

The control unit 911 may measure the position of the pen based on the received signals or the currents from each electrode of the electrode unit 913. In one embodiment, the control unit 911 may determine a position of a channel electrode of which a received signal or a current is the largest among the received signals or currents from each electrode as the position of the pen. In addition, the control unit 911 may also determine the position of the pen based on a comparative size of the received signals or currents received from each electrode. In addition, the control unit 911 may also determine the position of the pen based on an interpolation result for the received signals or currents from each electrode.

Figure 10A:
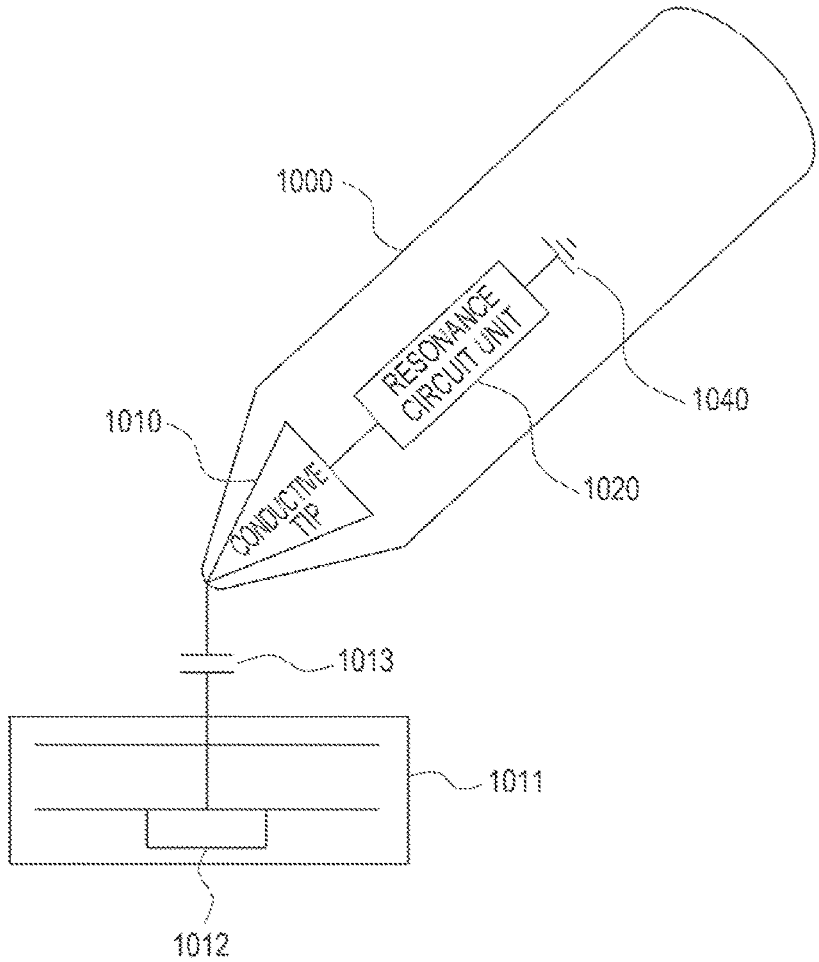
FIG. 10A is a conceptual diagram of a pen according to various embodiments of the present disclosure.

FIG. 10A is a conceptual diagram of a pen according to various embodiments of the present disclosure.

As shown in FIG. 10A, a pen 1000 may include a conductive tip 1010, a resonance circuit unit 1020 and a ground unit 1040. An end of the conductive tip 1010 is connected to an end of the resonance circuit unit 1020. In addition, another end of the resonance circuit 1020 may be connected to the ground unit 1040. The pen 1000 may be implemented as, for example, a pen shape.

The conductive tip 1010 may form a capacitance 1013 with an electrode 1012 in a position measuring apparatus. The conductive tip 1010 may form, for example, a metallic tip, and may form the capacitance 1013 with at least one electrode 1012. The conductive tip 1010 may be in nonconductive material or a portion of the conductive tip 1010 may be exposed to the outside thereof. In addition, the electrode 1012 may be formed of a transparent electrode at a lower end of a transparent window 1011 so as to be applied to a touch screen.

The resonance circuit unit 1020 may resonate to a transmission signal input from the position measuring apparatus. The resonance circuit unit 1020 may output a resonance signal by the resonance after the input of the transmission signal is stopped. The resonance circuit unit 1020 may output a sine waveform signal having a resonance frequency of the resonance circuit 1020. In an embodiment of the present disclosure, a sine waveform signal having a specific resonance frequency may be pen identification information.

That is, the position measuring apparatus may determine that a type of a touched object is the pen when the sine waveform signal having the specific resonance frequency is included in the received signal.

Meanwhile, according to another embodiment of the present disclosure, the resonance frequency of the resonance circuit unit 1020 may be changed according to a touch pressure of the conductive tip 1010. For example, when a user touches using the pen, the resonance frequency of the resonance circuit unit 1020 may be changed. Thus, the position measuring apparatus may determine a pen pressure based on a change of the resonance frequency. In addition, the resonance circuit unit 1020 may further include a resistor connected thereto in parallel. The resistor may be a variable resistor, and a resonance attributes may be changed according to a change of a resistance. In addition, the pen may further include a switch unit which may be mechanically operated by a user. The resonance attributes of the pen may be changed according to a state of the switch unit. Thus, the user may input, for example, writing and erasing functions, on the basis of on and off states of the switch unit.

Figure 10B:
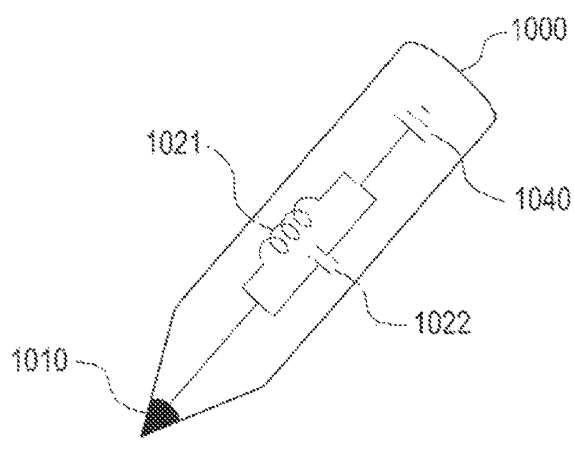
FIG. 10B illustrates a circuit configuration of the pen in FIG. 10A according to various embodiments of the present disclosure.

FIG. 10B illustrates a circuit configuration of the pen in FIG. 10A according to various embodiments of the present disclosure. As shown in FIG. 10B, the resonance circuit unit 1020 may include a coil 1021 and a capacitor 1022.

Figure 10C:
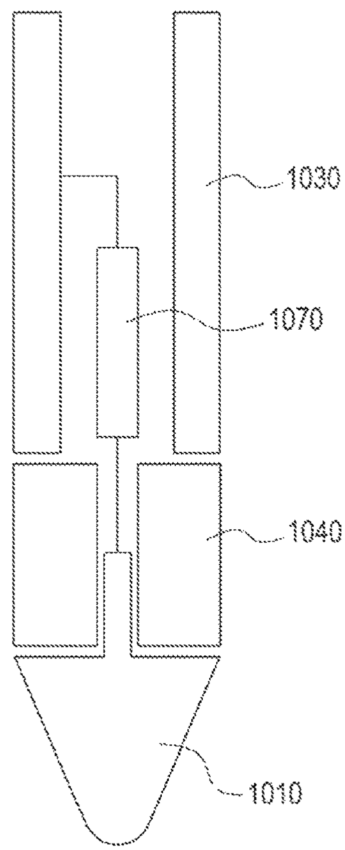
FIG. 10C is a cross-sectional view of a coordinate display apparatus according to an embodiment of the present disclosure.

FIG. 10C is a cross-sectional view of a coordinate display apparatus according to an embodiment of the present disclosure.

As shown in FIG. 10C, the pen may include a conductive tip 1010, a ground unit 1030, an insulating unit 1040 and a passive circuit unit 1070.

The conductive tip 1010 may form a capacitance with electrodes in the position measuring apparatus. A portion of the conductive tip 1010 may be exposed to the outside of the pen as shown in FIG. 10C. Meanwhile, in order to soften a sense of a writing when the pen is used, the pen may further include the insulating unit for preventing a direct contact between the conductive tip 1010 and the outside.

The passive circuit unit 1070 may be electrically connected to the conductive tip 1010. The passive circuit unit 1070 may generate pen identification information. That is, the passive circuit unit 1070 may differentiate physical attributes of the pen from attributes of the finger. In one embodiment, the passive circuit unit 1070 may include a device which receives an electric field and outputs an electric field or a magnetic field having a predetermined frequency corresponding to the electric field. For example, in FIG. 10A, the resonance circuit unit is described as an example of the passive circuit unit 1070.

The insulating unit 1040 may insulate the conductive tip 1010 from the ground unit 1030. If, the insulating unit 1040 has a function of insulating the conductive tip 1010 from the ground unit 1030, a shape of the insulating unit is not limited. The ground unit 1030 may be connected to the passive circuit unit 1070, and may be electrically connected to a user or the coordinate measuring apparatus through at least one of a direct contact and a capacitive coupling.

Figure 10D:
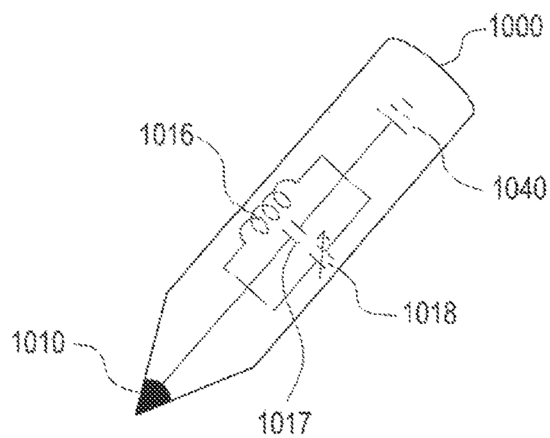
FIG. 10D illustrates a circuit diagram of the pen in FIG. 10A according to various embodiments of the present disclosure.

FIG. 10D illustrates a circuit diagram of the pen in FIG. 10A according to various embodiments of the present disclosure. As shown in FIG. 10D, a resonance circuit unit 1015 may include a coil 1016, a capacitor 1017 and a variable capacitor 1018 connected each other in parallel. That is, the resonance circuit may further include the coil 1016 and two capacitors 1017 and 1018. Meanwhile, it is illustrated that the variable capacitor 1018 is connected to the capacitor 1017 in parallel, but this is a simple example.

A conductive tip 1010 may form a capacitance with electrodes in a position measuring apparatus. The resonance circuit unit 1015 may be electrically connected to the conductive tip 1010. The resonance circuit unit 1015 may generate and output pen identification information. For example, the resonance circuit unit 1015 may generate a resonance based on a received electric field and output an electric field or a magnetic field having a predetermined frequency. That is, the resonance circuit unit 1015 may differentiate physical attributes of the pen from attributes of the finger.

In addition, a variable impedance 1018 may include a device of which an impedance may be changed due to at least one of a touch pressure and a touch-or-not between the pen 1000 and the position measuring apparatus. Since the variable impedance 1018 provides the impedance which is changed by at least one of the touch pressure and user selection switch on and off, resonance attributes may be changed according to the touch pressure and the user selection switch on and off.

The position measuring apparatus may determine at least one state of the touch pressure of the pen 1000 and the user selection switch on and off based on the changed resonance attributes. The variable impedance of this time may include a reactance or a resistance component which is changed according to the touch pressure or the user selection switch on and off. Meanwhile, the resonance circuit unit 1015 may have high-impedance attributes at a specific resonance frequency. Therefore, the position measuring apparatus may receive the received signals having different frequencies from the pen 1000 according to different touch pressures between the pen 1000 and the position measuring apparatus. More specifically, when the frequency of the received signal which is received from the pen 1000 by the position measuring apparatus is f1, the position measuring apparatus may determine the touch pressure is P1. In addition, when the frequency of the received signal which is received from the pen 1000 by the position measuring apparatus is f2, the position measuring apparatus may determine the touch pressure is P2.

It is assumed that an inductance of the coil 1016 is L1 and a capacitance of the capacitor 1017 is C1. In various embodiments, the variable impedance 1018 may be implemented as a variable capacitor. It is assumed that the capacitance of the variable impedance 1018 is C2. The resonance frequency of the pen 1000 may be $$\frac{1}{2\pi\sqrt{L1(C1+Cm)}},$$

and the resonance frequency may be changed according to a change of Cm. In one embodiment, the capacitance Cm of the variable impedance 1018 may be changed according to a change of the touch pressure. For example, the position measuring apparatus may store information in which the capacitance Cm of the variable impedance 1018 is C2 when a pressure is P1 and the capacitance Cm of the variable impedance 1018 is C3 when a pressure is P2. Therefore, when the frequency of the received signal from the pen 1000 is $$\frac{1}{2\pi\sqrt{L1(C1+C2)}},$$

the position measuring apparatus may determine the touch pressure is P1, and when the frequency of the received signal from the pen 1000 is $$\frac{1}{2\pi\sqrt{L1(C1+C3)}},$$

the position measuring apparatus may determine the touch pressure is P2.

Figure 10E:
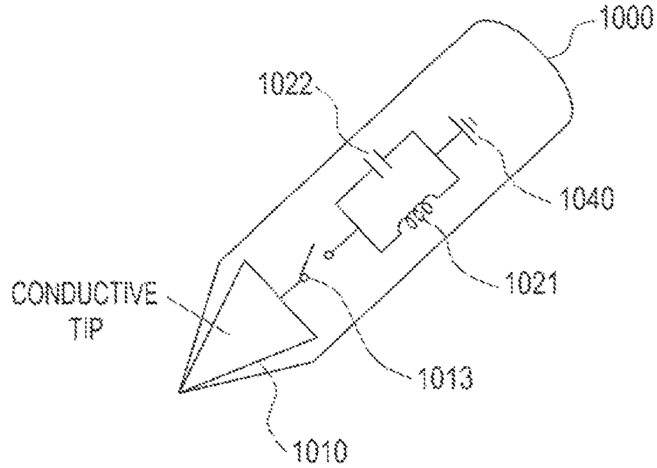
FIG. 10E is a conceptual diagram of a pen according to various embodiments of the present disclosure.

FIG. 10E is a conceptual diagram of a pen according to various embodiments of the present disclosure.

As shown in FIG. 10E, the pen may include a conductive tip 1010, a coil unit 1021, a capacitor unit 1022, a switch unit 1013 and a ground unit 1040.

The conductive tip 310 may form a capacitance with electrodes in a coordinate measuring apparatus (not shown). The coil unit 1021 and the capacitor unit 1022 may form a parallel resonance circuit. Since the coil unit 1021 and the capacitor unit 1022 form the resonance circuit, the pen may output a resonance signal.

The switch unit 1013 may be connected to an end of the coil unit 1021 and an end of the capacitor unit 1022. The switch unit 1013 may be mechanically operated. The resonance attributes may be changed on the basis of on and off states of the switch unit 1013. For example, when the switch unit 1013 is the off state, the conductive tip 1010 may be disconnected from the resonance circuit, and when the switch unit 1013 is the on state, the conductive tip 1010 may be connected to the resonance circuit. As an embodiment such a configuration, when the conductive tip 1010 touches in a pressure equal to or higher than a predetermined critical value, the switch unit 1013 may form the resonance circuit, and when the conductive tip 1010 touches in a pressure lower than the predetermined critical value, the switch unit 1013 may disconnect an electrical connection so as not to form the resonance circuit. The position measuring apparatus may recognize an input only when the pen 1000 touches the position measuring apparatus in the pressure equal to or higher than the critical value, and thus an input of the pen due to a mistake can be effectively reduced.

Figure 10F:
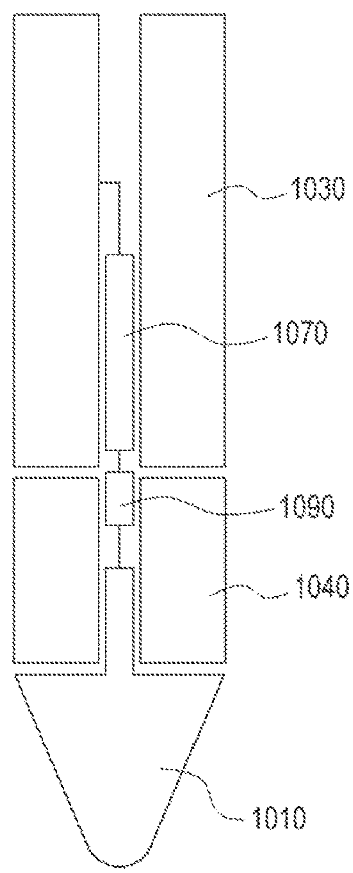
FIG. 10F is a cross-sectional view of a pen according to an embodiment of the present disclosure.

FIG. 10F is a cross-sectional view of a pen according to an embodiment of the present disclosure.

As shown in FIG. 10F, the pen may include a conductive tip 1010, a ground unit 1030, an insulating unit 1040, a resonance circuit unit 1070 and a switch unit 1090. The pen shown in FIG. 10F may further include the switch unit 1090 compared to the coordinate display apparatus of FIG. 10C. The switch unit 1090 may be electrically connected between the conductive tip 1010 and the resonance circuit unit 1070. In relation to FIG. 10G, the switch unit 1090 may operate a resonance circuit only when the conductive tip 1010 touches in a pressure equal to or higher than a predetermined critical value as described above.

Figure 11A:
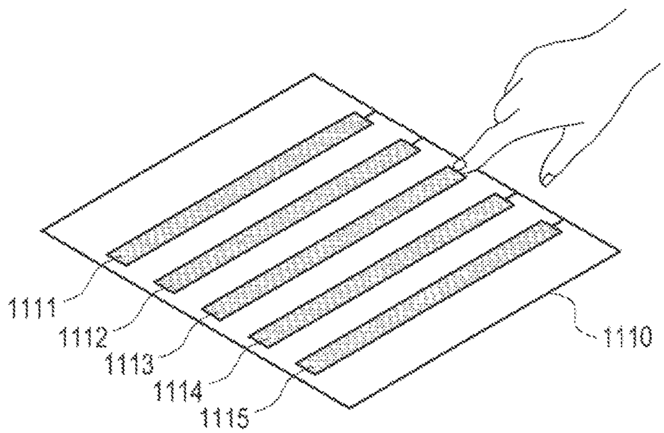
FIG. 11A illustrates a conceptual diagram of a panel of a position measuring apparatus according to various embodiments of the present disclosure.

FIG. 11A illustrates a conceptual diagram of a panel of a position measuring apparatus according to various embodiments of the present disclosure. As shown in FIG. 11A, the position measuring apparatus may include a panel 1110 including a plurality of electrodes 1111 to 1115. For a convenience of description, only the electrodes 1111 to 1115 extending in a y-axis direction for determining an x-axis position are illustrated, and a person having an ordinary skill in the art may easily understand that an electrode (not shown) extending in an x-axis direction may be included in the position measuring apparatus. Here, it is assumed that a finger touches a third electrode 1113.

Figure 11B:
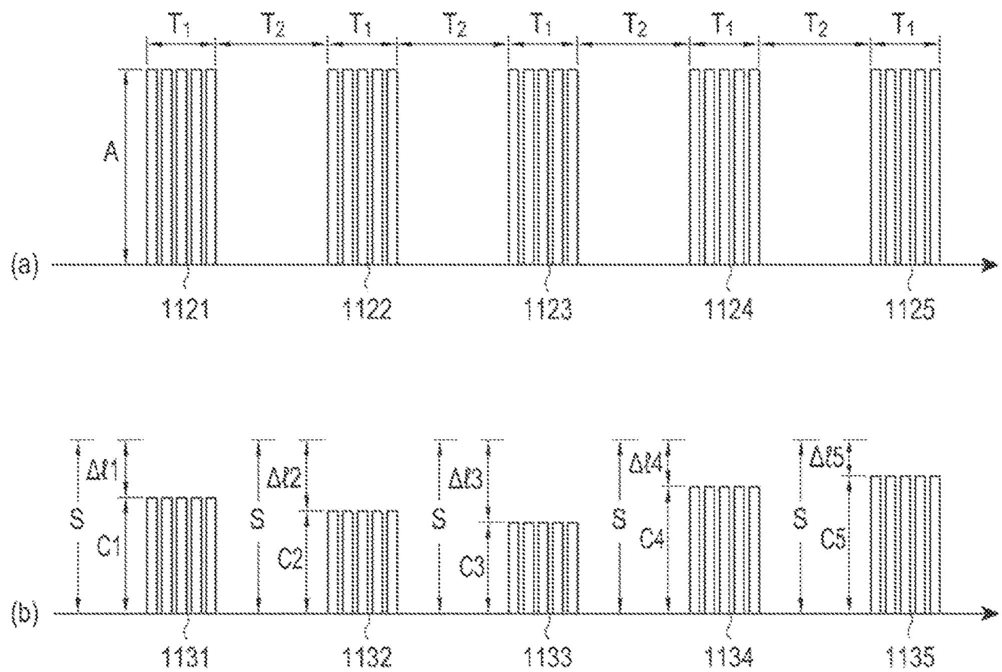
FIG. 11B illustrates a transmitted signal and a received signal of a case in which a finger touches.

A driving unit may apply driving signals 1121 to 1125 as shown in (a) of FIG. 11B to a driving electrode. Here, the driving electrode may be one of electrodes extending in the x-axis direction. The position measuring apparatus may apply a first driving signal to the driving electrode. For example, the position measuring apparatus may apply the first driving signal 1121 to the driving electrode. The position measuring apparatus may apply the first driving signal 1121 to the driving electrode during a driving period T1 and apply the second driving signal 1122 to the driving electrode during the driving period T1 after a non-driving period T2. Each of the driving signals 1121 to 1125 may have an amplitude A.

Meanwhile, (b) of FIG. 11B illustrates received signals 1131 to 1135 measured at the plurality of electrodes 1111 to 1115, respectively. For example, the first received signal 1131 measured at the first electrode 1111 may have an amplitude C1, and this may be lower than a reference amplitude S by Δ11. Table 1 below shows the received signals 1131 to 1135 which are received from each of the electrodes 1111 to 1115.

TABLE 1

| | Electrode | | | | |
|---|---|---|---|---|---|
| | First electrode (1111) | Second electrode (1112) | Third electrode (1113) | Fourth electrode (1114) | Fifth electrode (1115) |
| Amplitude | C1 | C2 | C3 | C4 | C5 |
| Change amount | Δl1 | Δl2 | Δl3 | Δl4 | Δl5 |

In an embodiment of FIGS. 11A and 11B, the amplitude C3 at the third electrode 1113 may be the least, that is, the change amount (Δ13) at the third electrode 1113 may be the largest. That is, the position measuring apparatus may determine an electrode of which the change amount at the third electrode 1113 is the largest as an electrode of which a capacitance change is the largest. When a finger touches a specific coordinate, a capacitance of an electrode corresponding to the specific coordinate or a capacitance between an electrode and adjacent electrodes may be changed. An intensity of an Rx signal may be changed based on the capacitance change, the position measuring apparatus may determine an electrode of which the capacitance change is the largest as a touch point of the finger. Thus, the position measuring apparatus may determine the third electrode 1113 as an electrode where the finger touches. As described above, the position measuring apparatus may determine a touch point based on the received signals from each of the electrodes 1131 to 1135 during the driving period T1 of the driving signal or currents from each of the electrodes 1131 to 1135.

Figure 12A:
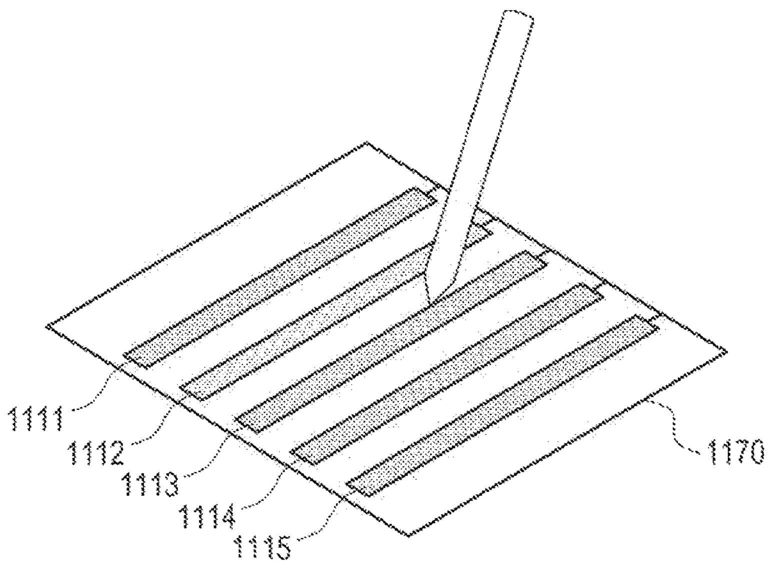
FIG. 12A illustrates a conceptual diagram of a case in which a pen according to various embodiments of the present disclosure touches a panel.

FIG. 12A illustrates a conceptual diagram of a case in which a pen according to various embodiments of the present disclosure touches a panel.

Figure 12B:
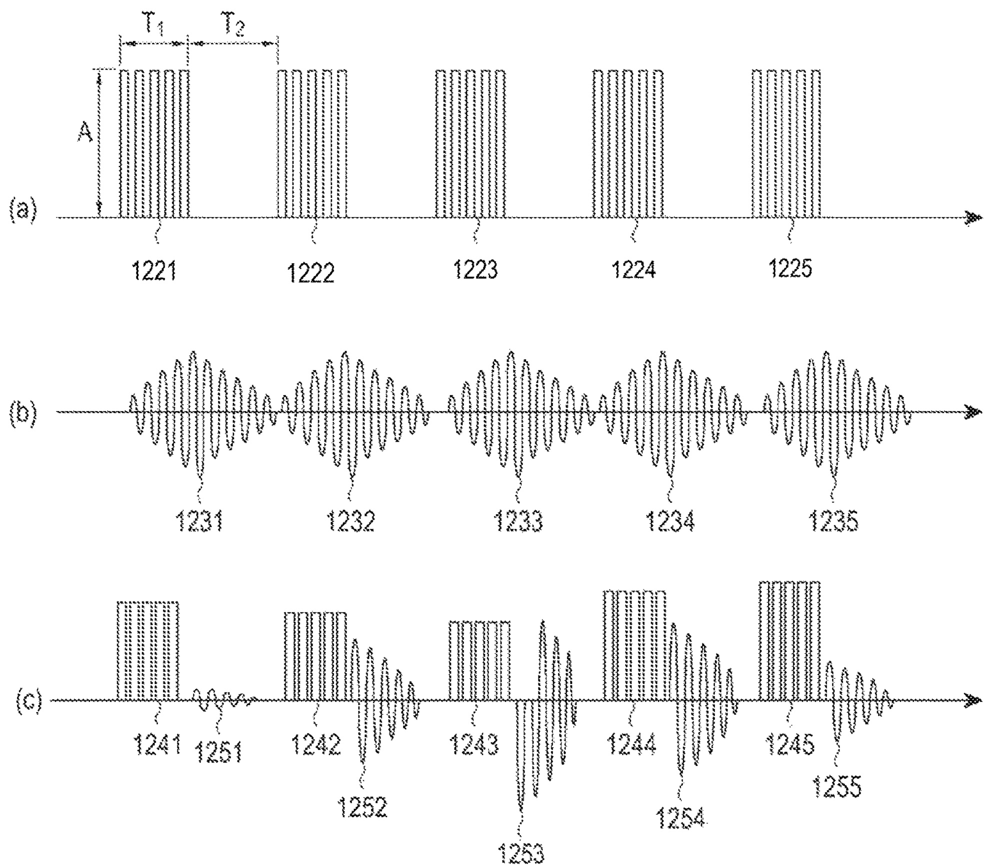
FIG. 12B illustrates a transmitted signal and a received signal of a case in which a pen touches.

As shown in FIG. 12A, it is assumed that the pen touches a third electrode 1113. FIG. 12B illustrates a transmitted signal and a received signal when a pen according to various embodiments of the present disclosure touches.

A driving unit may apply driving signals 1221 to 1225 as shown in (a) of FIG. 12B to a driving electrode. Here, the driving electrode may be one of electrodes extending in an x-axis direction. For example, a position measuring apparatus may apply a first driving signal 1221 to the driving electrode. The position measuring apparatus may apply the first driving signal 1221 to the driving electrode during a driving period T1 and apply the second driving signal 1222 to the driving electrode during the driving period T1 after a non-driving period T2. Each of the driving signals 1221 to 1225 may have an amplitude A. The driving electrode may generate an electric field based on the driving signals 1221 to 1225.

The pen may generate resonances 1231 to 1235 based on the electric field received from the driving electrode as shown in (b) of FIG. 12B.

(c) of FIG. 12B illustrates received signals from each of the electrodes 1111 to 1115. First, received signals 1241 to 1245 the same as those in the case in which the finger touches the third electrode 1113 may be measured during the first period. The third electrode 1113 may have the largest capacitance change due to the touch to the third electrode 1113 by the pen Thus, the received signal 1243 from the third electrode 1113 may have the least amplitude as shown in (c) of FIG. 12B during even the first period. The position measuring apparatus may determine the third electrode from which the received signal 1243 is the least as an electrode of which a capacitance change is the largest, that is a touch electrode.

Received signals 1251 to 1255 may be received from pen as shown in (c) of FIG. 12B during even the second period. The received signals 1251 to 1255 are an electric field by a resonance generated from the pen, the received signals 1251 to 1255 may have alternating current forms.

The position measuring apparatus may determine a touch point of the pen based on the received signals 1241 to 1245 during the first period, that is the driving period, from each of the electrodes 1111 to 1115. In addition, the position measuring apparatus may determine that a touched object is the pen based on the received signals 1251 to 1255 during the second period, that is the non-driving period. As shown in FIG. 11B, when the finger touches, any signal may not be received during the second period. Thus, the position measuring apparatus may determine a type of the touched object as one of the pen and the finger based on a measurement-or-not of the received signal or an existence-or-not of an alternating current waveform during the second period, that is the non-driving period.

Figure 13A:
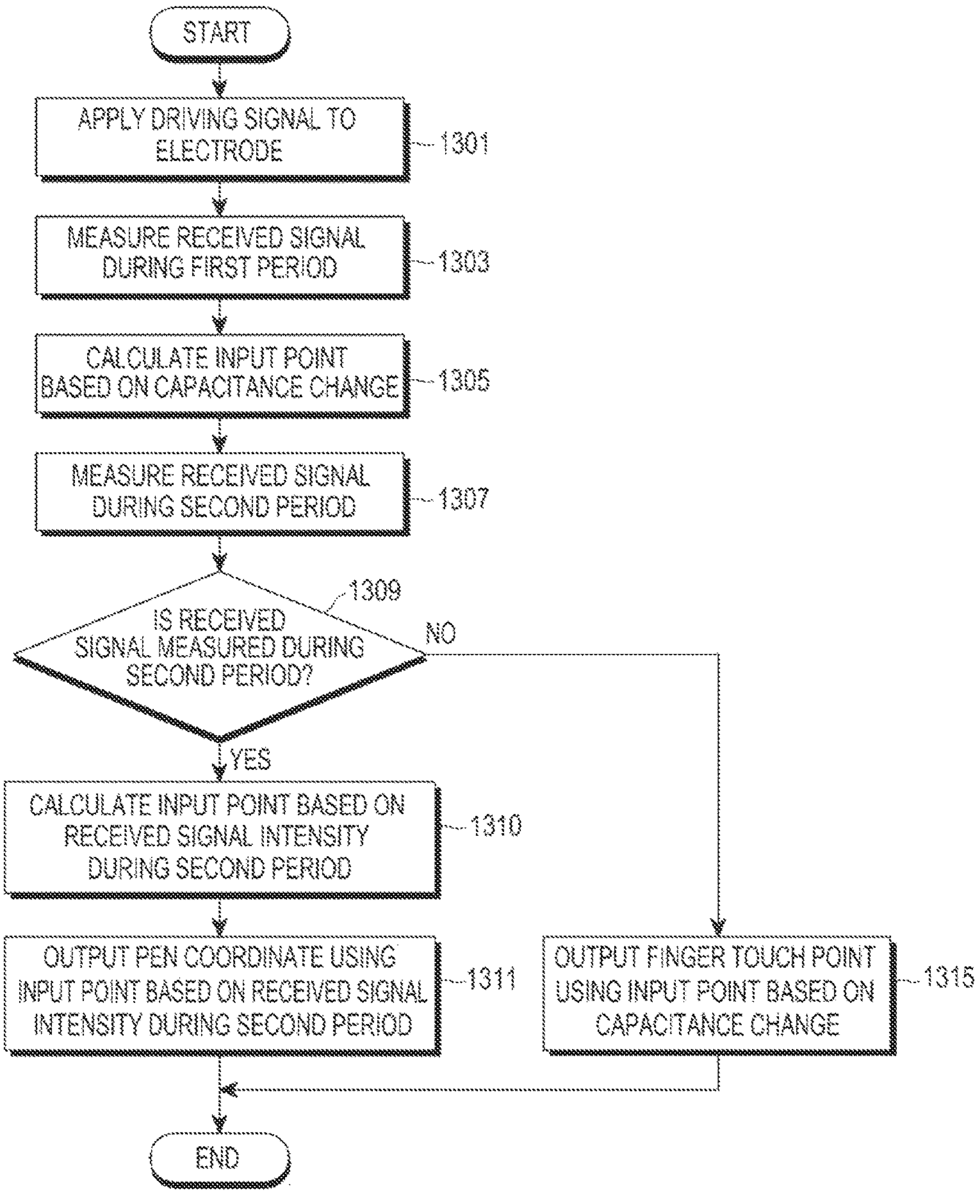
FIGS. 13A and 13B illustrate a flowchart of a control method of a position measuring apparatus according to various embodiments of the present disclosure.
Figure 13B:
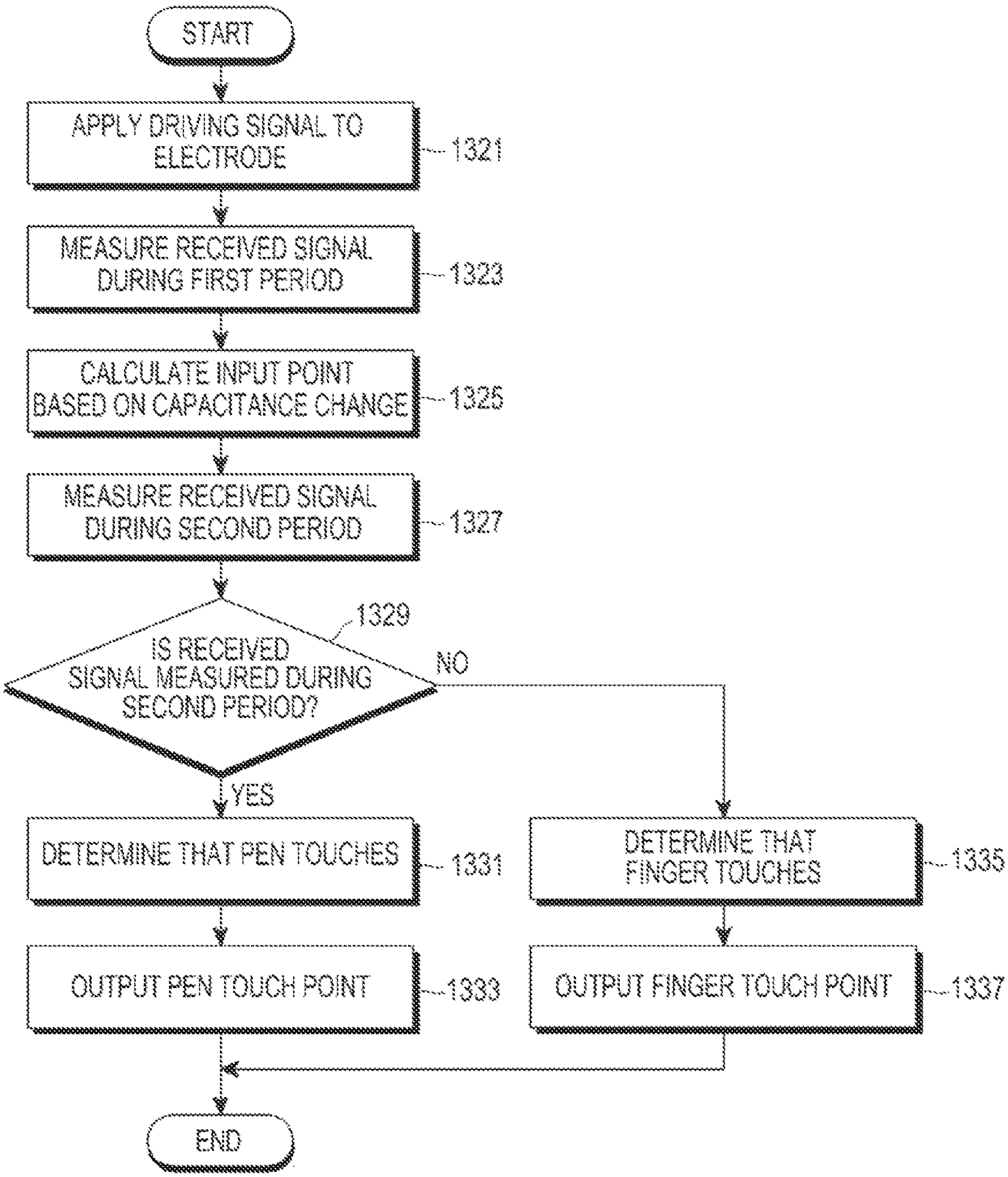

FIGS. 13A and 13B illustrate a flowchart of a control method of a position measuring apparatus according to various embodiments of the present disclosure.

First, referring to FIG. 13A, in step 1301, the position measuring apparatus may apply a driving signal to a driving electrode during a driving period, that is a first period. The driving electrode may generate an electric field based on the driving signal during the driving period.

In step 1303, the position measuring apparatus may measure a received signal measured at an electrode during the driving period. Alternatively, the position measuring apparatus may measure a current output from the electrode during the driving period.

In step 1305, the position measuring apparatus may determine whether a capacitance of the electrode is changed during the driving period. For example, the position measuring apparatus may determine whether the capacitance is changed based on an amplitude or a change amount of the received signal or the current measured at the electrode. The position measuring apparatus may determine an input point based on the capacitance change. In one embodiment, the position measuring apparatus may determine an electrode of which a capacitance change is the largest as the input point. In another embodiment, the position measuring apparatus may also determine a point where a capacitance change is the largest by an interpolation result for the capacitance change.

In step 1307 and 1309, the position measuring apparatus may determine whether the received signal is measured during a non-driving period, that is a second period. When it is determined that the received signal is measured during the non-driving period, in step 1311, the position measuring apparatus may calculate the input point based on an intensity of the received signal which is measured during the non-driving period in step of 1310. In step 1311, the position measuring apparatus may determine that the pen touches the input point calculated in step 1311 and outputs the position of the pen. When it is determined that the received signal is not measured during the non-driving period, in step 1315, the position measuring apparatus may determine that the finger touches an input point determined based on the capacitance change.

Next, referring to FIG. 13B, in step 1321, the position measuring apparatus may apply a driving signal to a driving electrode during a driving period, that is a first period. The driving electrode may generate an electric field based on the driving signal during the driving period.

In step 1323, the position measuring apparatus may measure a received signal measured at an electrode during the driving period. Alternatively, the position measuring apparatus may measure a current output from the electrode during the driving period.

In step 1325, the position measuring apparatus may determine whether a capacitance of the electrode is changed during the driving period. For example, the position measuring apparatus may determine whether the capacitance is changed based on an amplitude or a change amount of the received signal or the current measured at the electrode. The position measuring apparatus may determine an input point based on the capacitance change. In one embodiment, the position measuring apparatus may determine an electrode of which a capacitance change is the largest as an input point. In another embodiment, the position measuring apparatus may also determine a point where a capacitance change is the largest by an interpolation result for the capacitance change.

In step 1327, the position measuring apparatus may determine whether the received signal is measured during a non-driving period, that is a second period. When it is determined that the received signal is measured during the non-driving period, in step 1331, the position measuring apparatus may determine that the pen touches an input point calculated in step 1325. Meanwhile, when it is determined that the received signal is not measured during the non-driving period, that is the second period, in step 1335, the position measuring apparatus may determine that the finger touches an input point calculated in step 1325. In step 1337, the position measuring apparatus may output a finger touch point. In another embodiment, when the received signal includes an alternating current waveform during the non-driving period, the position measuring apparatus may determine that the pen touches. When the received signal does not include an alternating current waveform during the non-driving period, the position measuring apparatus may determine that the finger touches.

Figure 14:
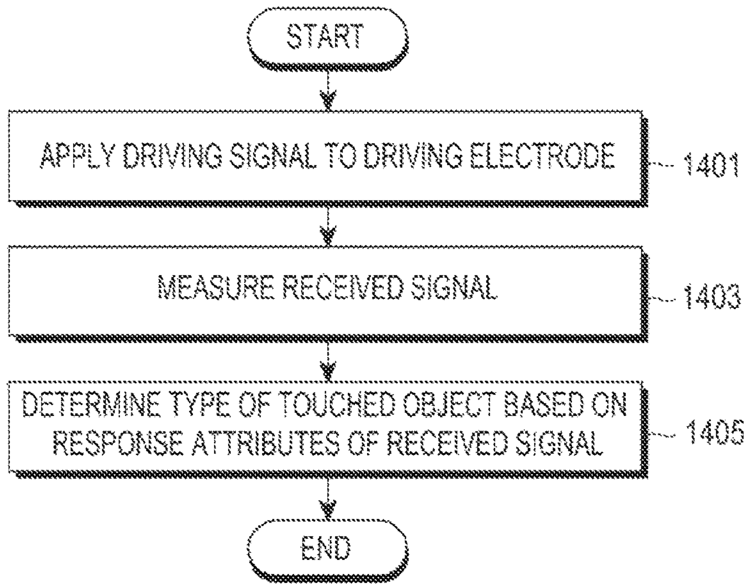
FIG. 14 illustrates a flowchart of a control method of a position measuring apparatus according to various embodiments of the present disclosure.

FIG. 14 illustrates a flowchart of a control method of a position measuring apparatus according to various embodiments of the present disclosure.

In step 1401, the position measuring apparatus may apply a driving signal to a driving electrode during a first period, which is a driving period.

In step 1403, the position measuring apparatus may measure received signals from each electrode during a non-driving period, which is a second period. Alternatively, the position measuring apparatus may measure currents from each electrode during the non-driving period.

In step 1405, the position measuring apparatus may determine a type of a touched object based on response attributes of the received signal during the non-driving period. For example, when it is determined that the received signal during the non-driving period includes an alternating current waveform, the position measuring apparatus may determine that the touched object is a pen. In addition, when it is determined that the received signal during the non-driving period does not include an alternating current waveform, the position measuring apparatus may determine that the touched object is a finger. For example, the position measuring apparatus may convert the signal during the non-driving period into a signal on a frequency area and detect whether the signal includes a specific frequency, that is a resonance frequency component to determine whether the signal includes an alternating current waveform. Meanwhile, a person having an ordinary skill in the art may easily understand that a configuration of the position measuring apparatus which determines whether the signal includes an alternating current waveform is not limited.

Figure 15:
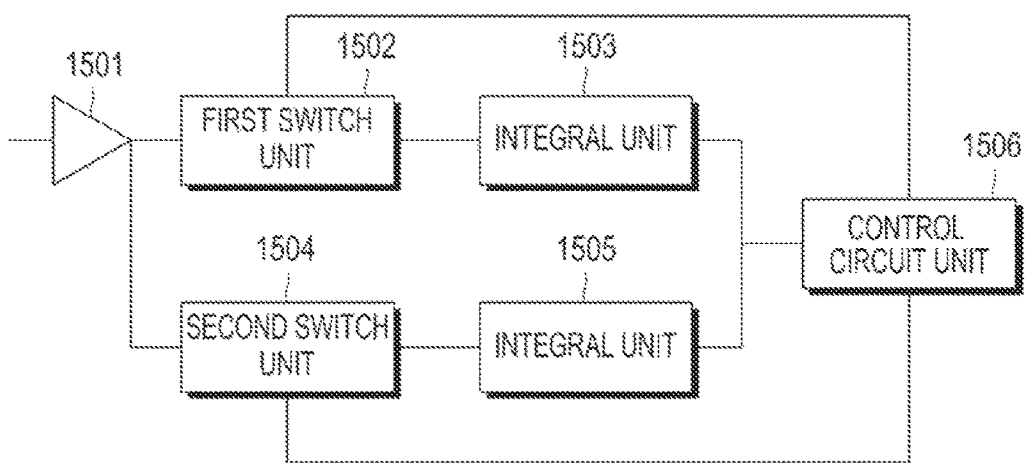
FIG. 15 is a block diagram for describing a method of measuring a resonance frequency change due to a pen pressure or switch on and off states according to an embodiment of the present disclosure.

Meanwhile, FIG. 15 is a block diagram for describing a method of measuring a resonance frequency change due to a pen pressure or switch on and off states according to an embodiment of the present disclosure.

A received signal may be amplified as much as a predetermined gain by an amplifying unit 1501. A first switch unit 1502 may output a received signal amplified during a first period to an integral unit 1503. Meanwhile, a second switch unit 1504 may output a received signal amplified during a second period to an integral unit 1505.

The first period and the second period may be overlapped, but a whole of the first period and a whole of the second period may be not the same. The first switch unit 1502 and the second switch unit 1504 may be turned on and off at a fixed time based on a generation and a termination of a driving signal from a control circuit unit 1506. In addition, in order to improve a received signal sensitivity, a rectifier and the like may be added.

The control circuit unit 1506 may measure frequency response attributes during different periods of the first period and the second period. Since a rate of a signal measured during each period may be different according to the frequency response attributes of a pen, the control circuit unit 1506 may determine a touch pressure of the pen or on and off states of the switch unit according to the rate of the signal measured during each period.

That is, the control circuit unit 1506 may measure the touch pressure or the switch on and off states based on the response attributes of a passive circuit of the pen during at least two different periods.

Figure 16:
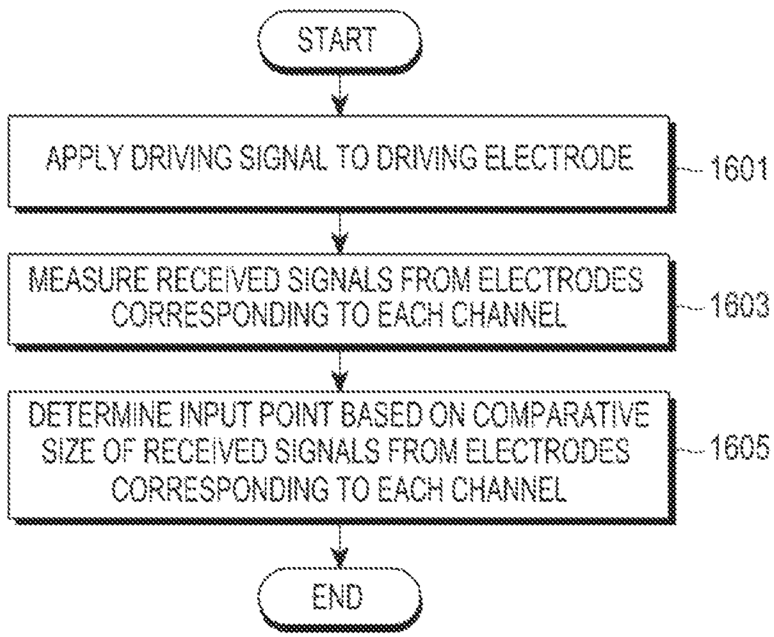
FIG. 16 illustrates a flowchart of a control method of a position measuring apparatus according to various embodiments of the present disclosure.
Figure 17A:
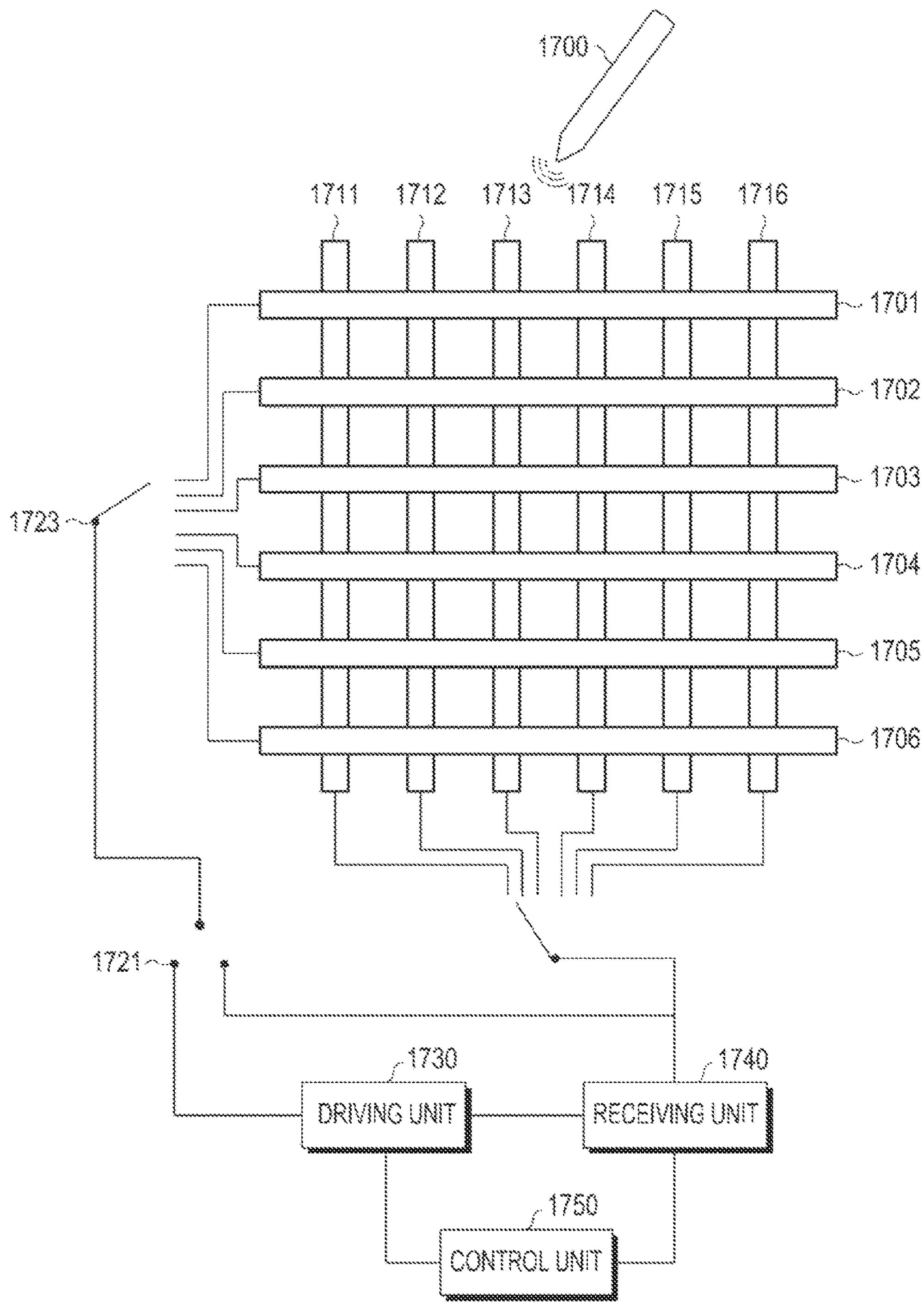
FIG. 17A illustrates a conceptual diagram of a position measuring apparatus according to various embodiments of the present disclosure.
Figure 17B:
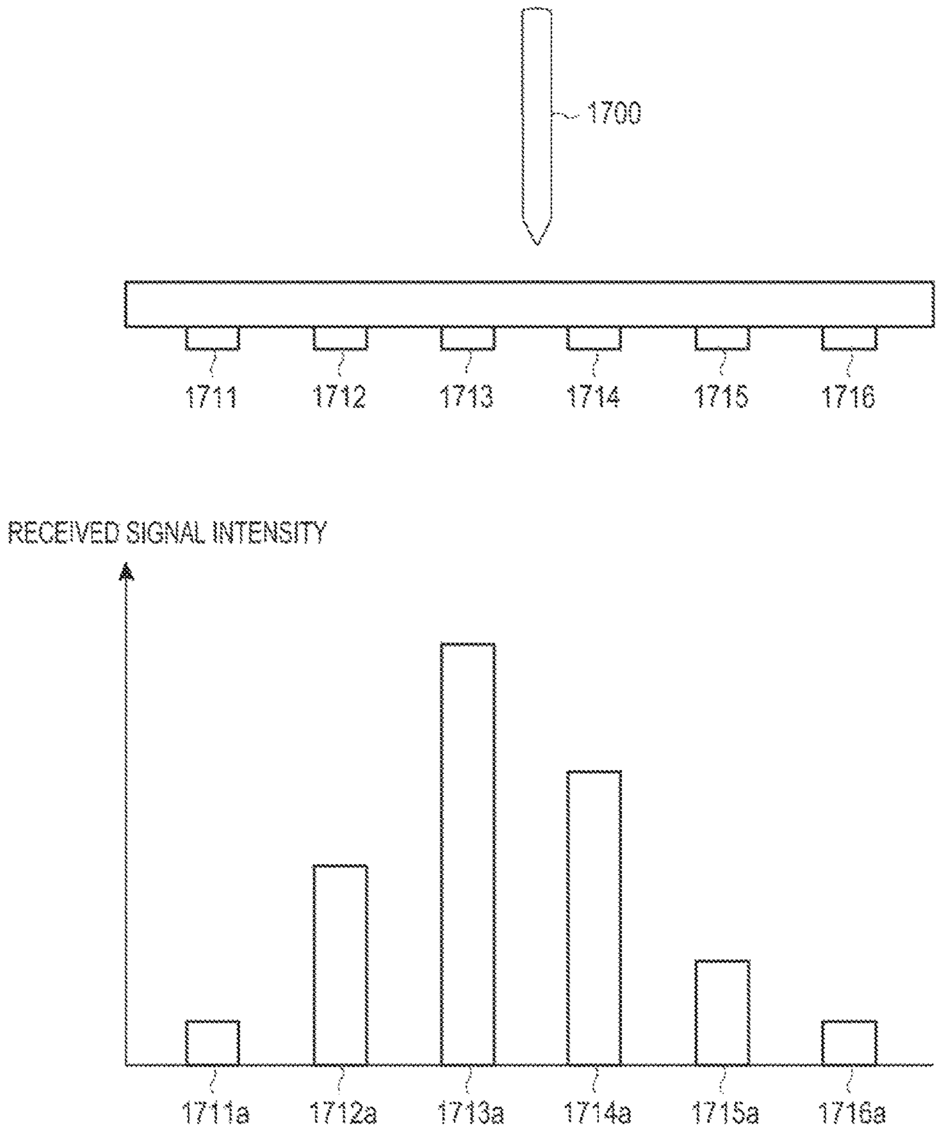
FIG. 17B illustrates a graph of received signals from electrodes corresponding to each channel according to various embodiments of the present disclosure.

FIG. 16 illustrates a flowchart of a control method of a position measuring apparatus according to various embodiments of the present disclosure. The embodiment of FIG. 16 will be described in more detail with reference to FIGS. 17A and 17B. FIG. 17A illustrates a conceptual diagram of a position measuring apparatus according to various embodiments of the present disclosure. FIG. 17B illustrates a graph of received signals from electrodes corresponding to each channel according to various embodiments of the present disclosure.

In step 1601, the position measuring apparatus may apply a driving signal to a driving electrode during a driving period.

As shown in FIG. 17A, the position measuring apparatus may include one or more horizontal electrodes 1701 to 1706 and one or more vertical electrodes 1711 to 1716. The horizontal electrodes 1701 to 1706 may be connected to a driving unit 1730 or a receiving unit 1740. A first switch 1721 may be connected to one of the horizontal electrodes 1701 to 1706. A third switch 1723 may connect one of the horizontal electrodes 1701 to 1706 with the driving unit 1730 or the receiving unit 1740. A second switch 1722 may connect one of the vertical electrodes 1711 to 1716 to the receiving unit 1740. The driving unit 1730 may be connected to a control unit 1750, and the receiving unit 1740 may be connected to the control unit 1750. The control unit 1750 may apply the driving signal to one driving electrode among the horizontal electrodes 1701 to 1706 by controlling the first switch 1721.

The driving unit 1730 may generate the driving signal having a frequency difference within a predetermined critical value from a resonance frequency. The driving signal generated from the driving unit 1730 may be transferred to one driving electrode among the horizontal electrodes 1701 to 1706 through the first switch 1721. One of the horizontal electrodes 1701 to 1706 may output an electric field to the outside based on the driving signal. Meanwhile, the horizontal electrodes 1701 to 1706 may form a capacitive coupling with a pen 1700. Therefore, the electric field generated from the driving electrode among the horizontal electrodes 1701 to 1706 may be transferred to the pen 1700. The pen 1700 may be resonated based on the transferred driving signal.

The driving unit 1730 may apply the driving signal to the driving electrode among the horizontal electrodes 1701 to 1706 during a first period, and may block the driving signal after the first period. The receiving unit 1740 may receive a resonance signal from the pen 1700 during a second period. The pen may generate a resonance signal based on energy accumulated in a resonance circuit during even a second period when the pen 1700 may not receive the electric field. The resonance signal generated from the pen 1700 may be transferred to each of the vertical electrodes 1711 to 1716 through a capacitive coupling formed between the pen 1700 and the vertical electrodes 1711 to 1716. The receiving unit 1740 may receive the resonance signal received from the vertical electrodes 1711 to 1716.

In step 1603, the position measuring apparatus may measure the received signals from the electrodes corresponding to each channel, which are the resonance signals. The control unit 1750 may control operations of the driving unit 1730, the receiving unit 1740 and first to third switches 1721 to 1723. In addition, the control unit 1750 may measure a position and a type of the pen 1700 by processing the resonance signal from the receiving unit 1740. For example, in step 1605, the position measuring apparatus may determine an input point based on a comparative size of the received signals corresponding to each channel. This will be described in more detail with reference to FIG. 17B.

FIG. 17B illustrates a position relation between the pen 1700 and the vertical electrodes 1711 to 1716 according to various embodiments of the present disclosure.

As shown in FIG. 17B, the pen 1700 may be positioned at an upper side of the third vertical electrode 1713. A graph of FIG. 17B illustrates intensities of resonance signals received from each of channels 1711*a* to 1716*a*. As shown in FIG. 17B, a resonance signal intensity at a channel 1713*a* corresponding to the third vertical electrode 1713 is the largest. The closer a distance between the pen 1700 and an electrode, the larger a capacitance formed between the pen 1700 and the electrode, and thus the intensity of the resonance signal generated from the pen 1700 may be strongly received. Therefore, the farther a distance from the pen 1700 is, the more the size of the received resonance signal is reduced. Thus, the control unit 1750 may determine the position of the pen 1700 from a comparative size of the received signal.

Meanwhile, various noises in addition to the resonance signal generated from the pen 1700 may be simultaneously input to the vertical electrodes 1711 to 1716. The input noise may disturb a calculation of an accurate touched position.

Figure 18:
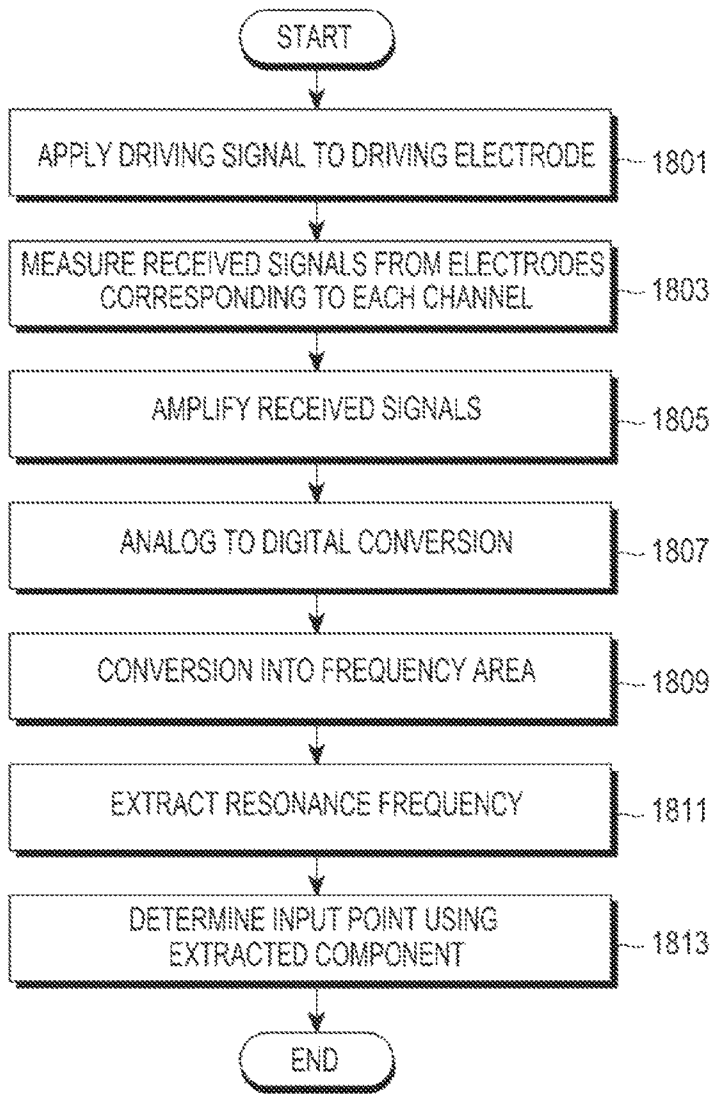
FIG. 18 illustrates a flowchart of a noise eliminating method of a position measuring apparatus according to various embodiments of the present disclosure.

FIG. 18 illustrates a flowchart of a noise eliminating method of a position measuring apparatus according to various embodiments of the present disclosure. The embodiment of FIG. 18 will be described in more detail with reference to FIGS. 19A to 19D.

The position measuring apparatus according to various embodiments of the present disclosure may extract a signal of a resonance frequency area among received resonance signals. As described above, the resonance signal from the pen may have a resonance frequency. The position measuring apparatus according to various embodiments of the present disclosure may extract a signal of a resonance frequency band, and thus a Signal to Noise Ratio (SNR) may be improved.

In step 1801, the position measuring apparatus may apply a driving signal to a driving electrode during a driving period. In step 1803, the position measuring apparatus may measure received signals from each electrode corresponding to each channel during a non-driving period.

Figure 19A:
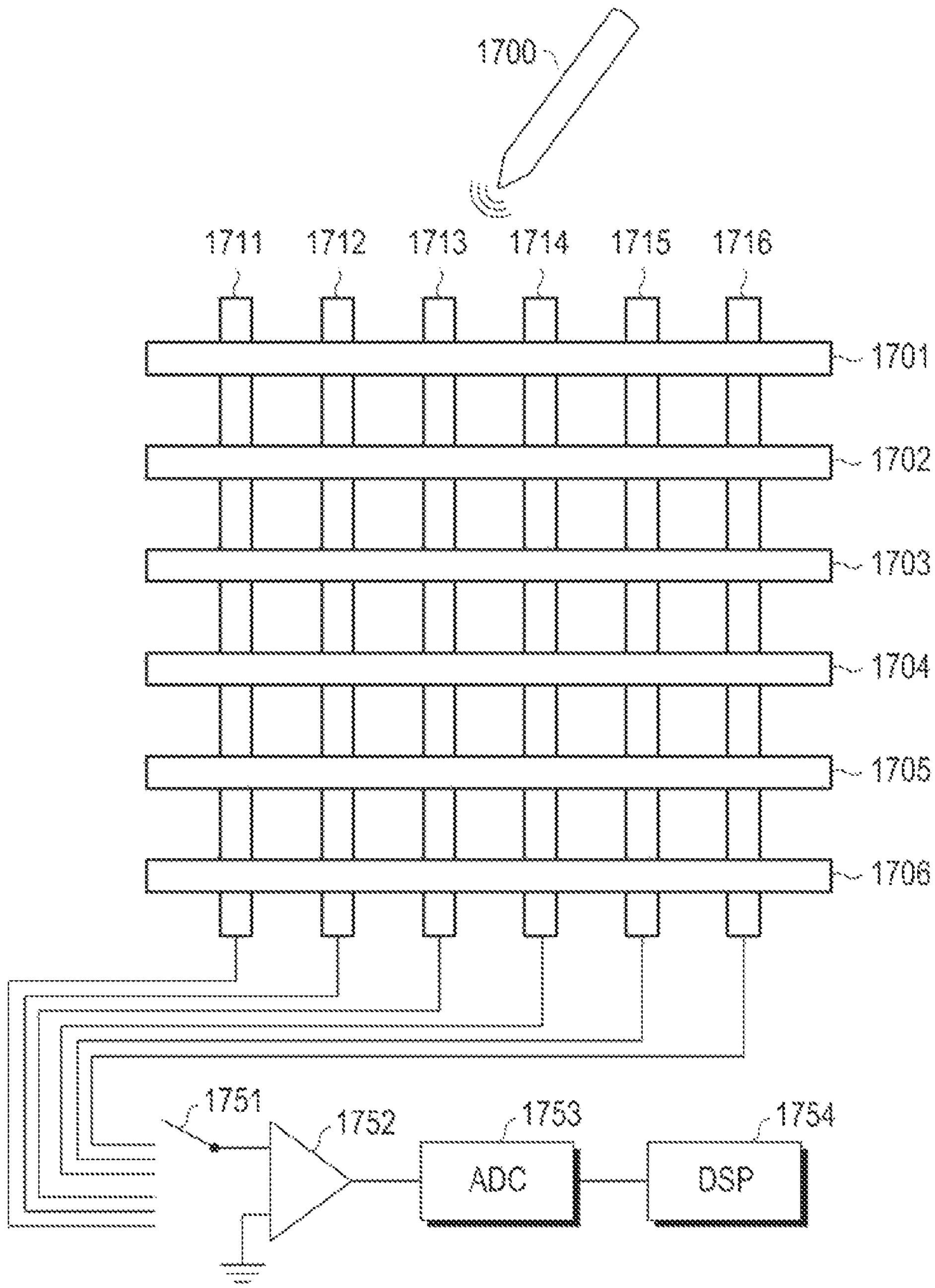
FIG. 19A illustrates a conceptual diagram for measuring a position of a pen according to various embodiments of the present disclosure.

In step 1805, the position measuring apparatus may amplify the received signal measured during the non-driving period. For example, as shown in FIG. 19A, vertical electrodes 1711 to 1716 may be connected to an amplifier 1752 through a switch 1751. The amplifier 1752 may amplify the received resonance signal and transfer the amplified resonance signal to an Analog to Digital Converter (ADC) 1753.

In step 1807, the ADC 1753 may convert the received resonance signal of an analog form to a digital signal. In step 1809, a Digital Signal Processing (DSP) unit 1754 may perform a Fourier transform on the digital signal to convert the digital signal into a signal on a frequency area. In step 1811, the DSP 1754 may extract a resonance frequency component or a band signal including a resonance frequency among the Fourier-transformed signals. More specifically, the DSP 1754 may extract a first range, that is 460 to 470 KHZ corresponding to a case in which a button of the pen is turned on and the pen has a pressure due to a touch between the pen and the position measuring apparatus. Alternatively, the DSP 1754 may extract a second range, for example 470 to 490 KHZ corresponding to a case in which the button of the pen is turned on. In addition, the DSP 1754 may extract a third range, for example 490 to 500 KHZ corresponding to a case in which the pen has a pressure due to the touch between the pen and the position measuring apparatus. In addition, the DSP 1754 may extract 500 KHZ corresponding to a case in which the pen is a floating input. The floating input is a state in which the pen is not contacted with the position measuring apparatus. The floating input may be referred to as a hovering input in some cases.

In step 1813, the position measuring apparatus may determine an input point using the extracted component. Therefore, remaining noise except for the resonance signal may be excluded, and thus SNR may be improved.

Figure 19B:
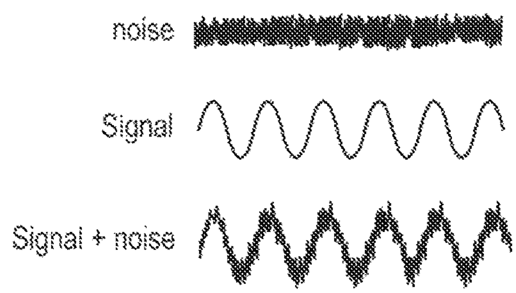
FIG. 19B illustrates a signal waveform according to various embodiments of the present disclosure.
Figure 19C:
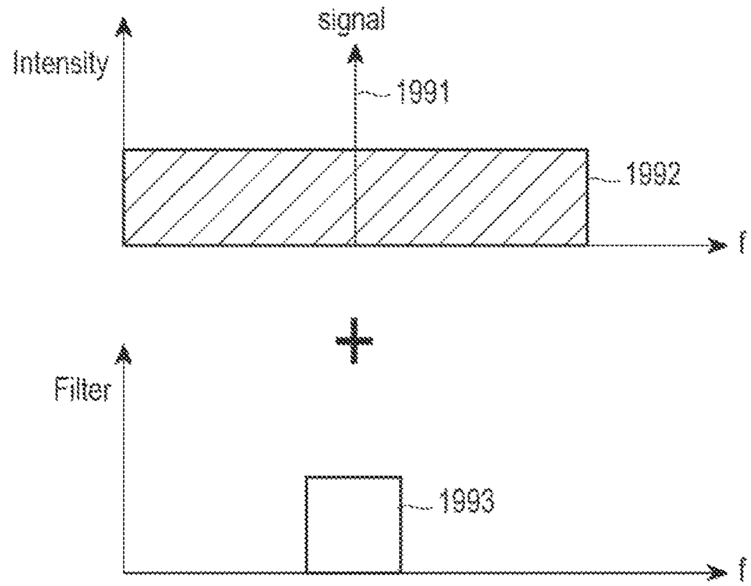
FIGS. 19C and 19D illustrate a noise elimination process according to various embodiments of the present disclosure.

FIG. 19B illustrates a waveform in which a resonance signal and a noise are together received. FIG. 19C illustrates a frequency area which is a Fourier transform result for an analog signal. As shown in FIG. 19C, a signal 1991 and a noise 1992 may be included in a frequency area. A position measuring apparatus may perform a band pass filtering on a band 1993 including a resonance frequency in the frequency area.

Figure 19D:
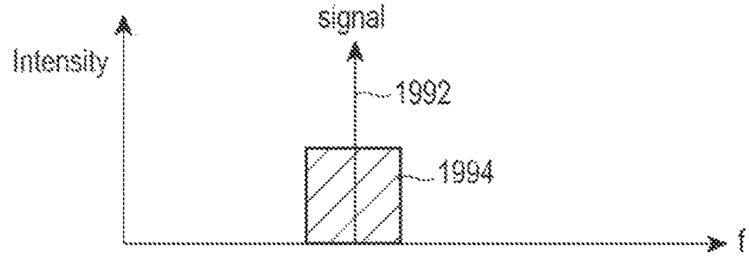

FIG. 19D may be a result obtained by extracting a specific band component related to a resonance frequency with respect to a Fourier transform. As shown in FIG. 19D, a portion of a noise 1994 is remained, and thus an SNR can be improved.

Figure 20:
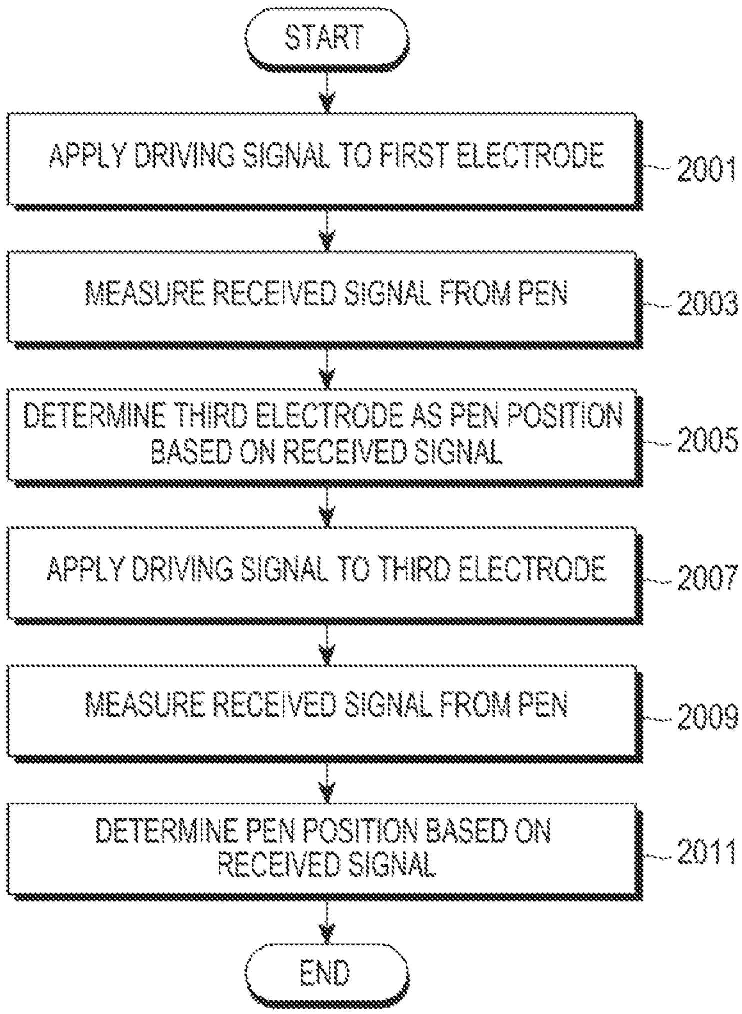
FIG. 20 illustrates a flowchart of a control method of a position measuring apparatus according to various embodiments of the present disclosure.

FIG. 20 illustrates a flowchart of a control method of a position measuring apparatus according to various embodiments of the present disclosure. The embodiment of FIG. 20 will be described in more detail with reference to FIGS. 21A and 21B.

Figure 21A:
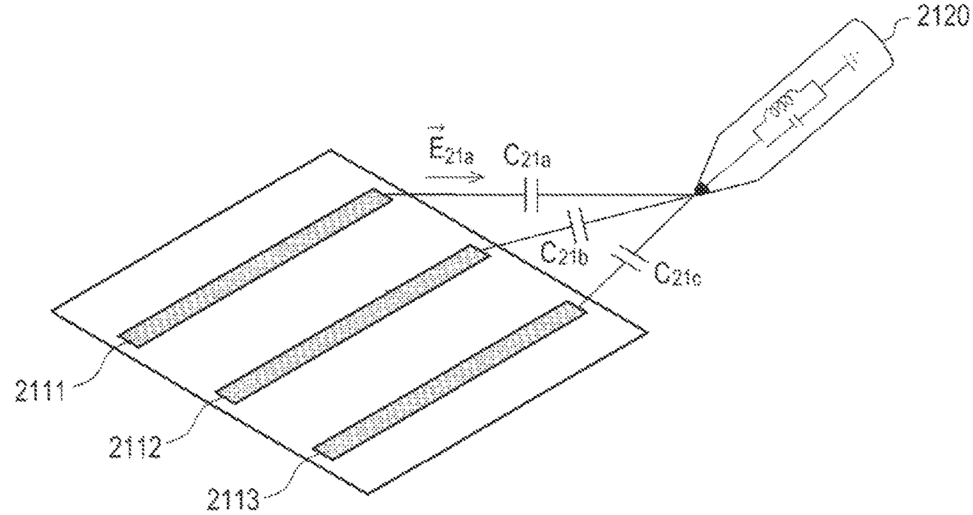
FIGS. 21A and 21B illustrate a capacitive coupling forming according to various embodiments of the present disclosure.

In step 2001, a position measuring apparatus may apply a driving signal to a first electrode 2111 of FIG. 21A. That is, the position measuring apparatus may determine the first electrode 2111 as a driving electrode and apply the driving signal to the first electrode 2111 during a driving period. As shown in FIG. 21A, an electric field E21*a* may be transferred through a capacitance C21*a* formed between the first electrode 2111 and a pen 2120. A second electrode 2112 may form a capacitance C21*b* with the pen 2120, and a third electrode 2113 may form a capacitance C21*c* with the pen 2120. In step 2003, the position measuring apparatus may measure a received signal from the pen 2120. In step 2005, the position measuring apparatus may determine the third electrode 2113 as a position of the pen 2120 based on the received signal. The position measuring apparatus may measure received signals from each of the first to third electrodes 2111 to 2113, and may determine the third electrode 2113 as the position of the pen 2120 based on the measured received signals.

Figure 21B:
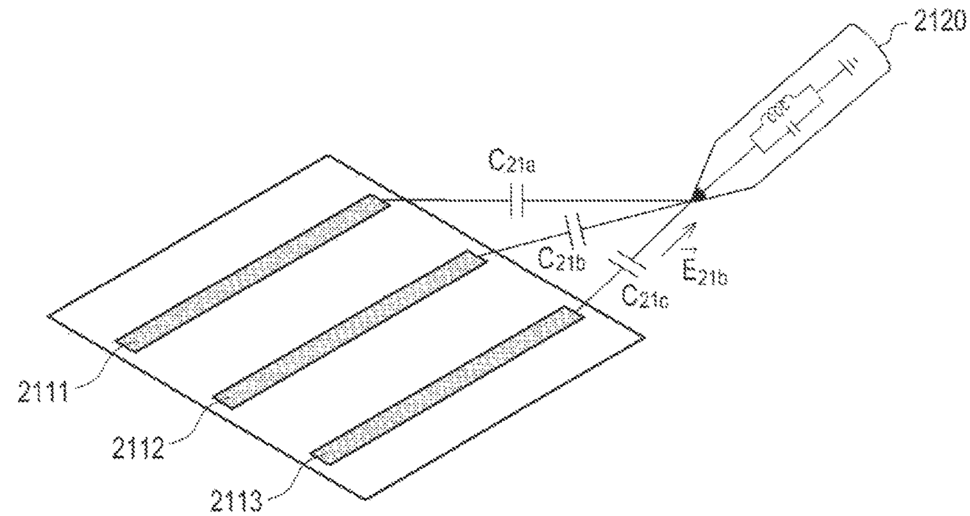

In step 2007, the position measuring apparatus may apply the driving signal to the third electrode 2113 of FIG. 21B. That is, the position measuring apparatus may determine the third electrode 2113 as the driving electrode, and may apply the driving signal to the third electrode 2113 during the driving period. As shown in FIG. 21B, an electric field E21*b* may be transferred through the capacitance C21*c* formed between the third electrode 2113 and the pen 2120. Since the third electrode 2113 which is comparatively adjacent to the pen 2120 is updated as the driving electrode, a size of the electric field E21*b* transferred from the driving electrode to the pen 2120 may be larger than that of the previous electric field E21*a*.

In step 2009, the position measuring apparatus may measure the received signal again. In step 2011, the position measuring apparatus may determine the position of the pen based on the received signal. That is, the position measuring apparatus may update the driving electrode based on the determined position of the pen, and may use the updated driving electrode in measuring a position of a next pen.

Figure 22A:
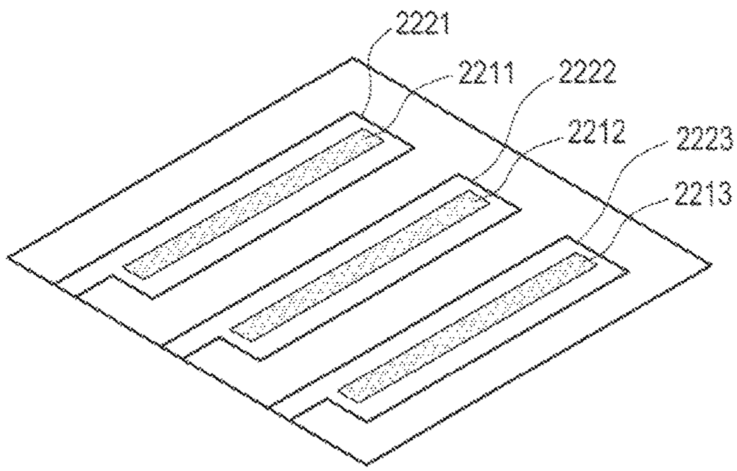
FIGS. 22A to 22C illustrate a conceptual diagram of a position measuring apparatus that measures a position of a pen according to various embodiments of the present disclosure.

FIG. 22A illustrates a conceptual diagram of a position measuring apparatus that measures a position of a pen according to various embodiments of the present disclosure.

As shown in FIG. 22A, the position measuring apparatus may include an electrode unit and a coil unit. The electrode unit includes one or more electrodes 2211, 2212 and 2213. The coil unit includes one or more coils 2221, 2222 and 2223. The electrode unit and the coil unit may be formed on one substrate. A position of the first electrode 2211 may correspond to the first coil 2221, a position of the second electrode 2212 may correspond to the second coil 2222, and a position of the third electrode 2213 may correspond to the third coil 2223.

Figure 22B:
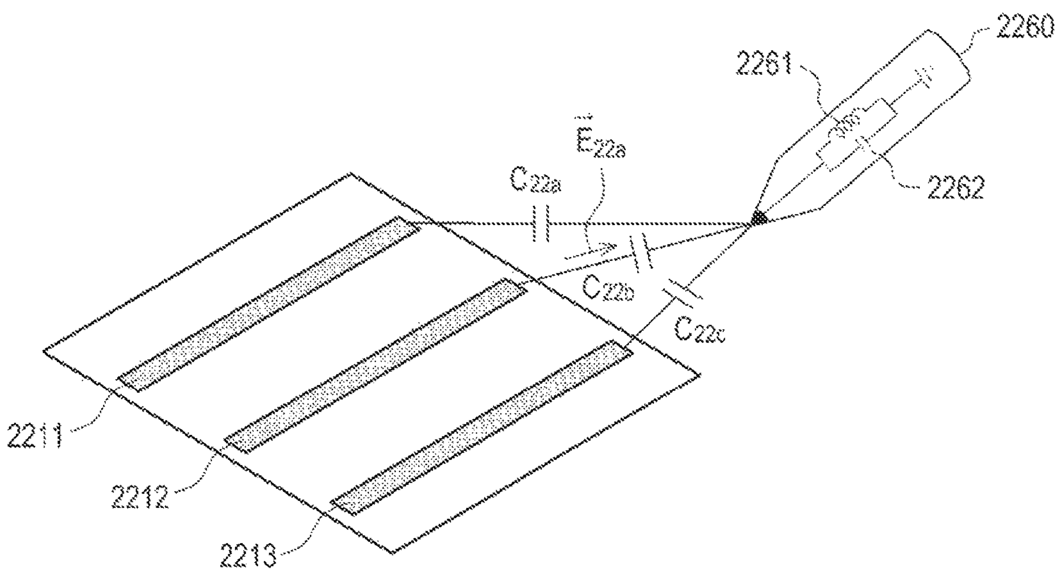

As shown in FIG. 22B, a position measuring apparatus by a comparison embodiment may apply a driving signal to a driving electrode, for example, the second electrode 2212. An electric field E22*a* may be output by the driving signal applied to the second electrode 2212. The second electrode, that is the driving electrode may a capacitance C22*b* with a conductive tip of the pen. The second electrode 2212, that is the driving electrode may output the electric field E22*a* through the formed capacitance C22*b*. Meanwhile, the first electrode 2211 may form a capacitance C22*a* with the conductive tip of the pen, and the third electrode 2213 may form a capacitance C22*c* with the conductive tip of the pen.

Figure 22C:
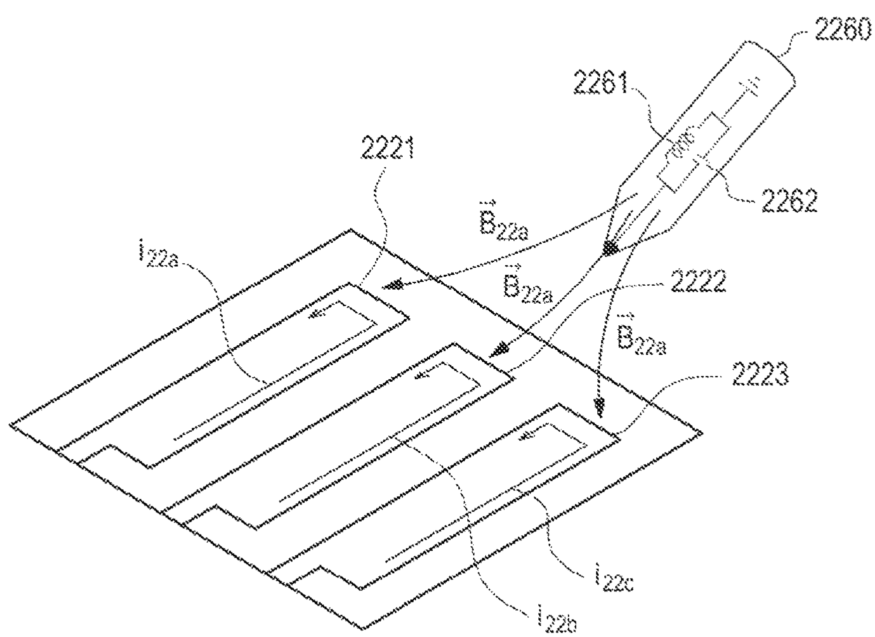

A pen 2260 by the various embodiments of the present disclosure may include a resonance circuit 2261 and 2262. The resonance circuit 2261 and 2262 may generate a resonance by the electric field E22*a*. An electromagnetic wave may be generated by the generated resonance. As shown in FIG. 22C, the resonance circuit 2261 and 2262 of the pen 2260 by the embodiment may output a magnetic field B22*a*.

The first coil 2221 may generate an induced electromotive current i22*a* by the magnetic field B22*a* output from the pen 2260. An intensity of the magnetic field B22*a* output from the pen 2260 may be reduced in inverse proportion to a square of a distance from a generation point. When the intensity of the magnetic field B22*a* output from the pen 2260 is R and a distance from the pen 2260 to the first coil 2221 is r1, the intensity of the magnetic field B22*a* at the first coil 2221 is $R/r1^2$. In addition, the induced electromotive current i22*a* at the first coil 2221 may be in proportion to $R/r1^2$ which is the intensity of the magnetic field B22*a* at the first coil 2221. When the intensity of the magnetic field B22*a* output from the pen 2260 is R and a distance from the pen 2260 to the second coil 2222 is r2, the intensity of the magnetic field B22*a* at the second coil 2222 is $R/r2^2$. In addition, an induced electromotive current i22*b* at the second coil 2222 may be in proportion to $R/r2^2$ which is the intensity of the magnetic field B22*a* at the second coil 2222. When the intensity of the magnetic field B22*a* output from the pen 2260 is R and a distance from the pen 2260 to the third coil 2223 is r3, the intensity of the magnetic field B22*a* at the third coil 2223 is $R/r3^2$. In addition, an induced electromotive current i22*c* at the third coil 2223 may be in proportion to $R/r3^2$ which is the intensity of the magnetic field B22*a* at the third coil 2223. Therefore, the closer the distance between the pen and the coil is, the larger the formed induced electromotive current is. The position measuring apparatus by the comparison embodiment may measure the position of the pen 2260 using intensities of the induced electromotive currents i22*a*, i22*b* and i22*c* at each of the coils 2221, 2222 and 2223 during a non-driving period, that is a second period.

The position measuring apparatus by the embodiment may determine whether a type of a touched object is the pen 2260 or a finger. For example, when a change of a capacitance at the electrode unit is detected, the position measuring apparatus may determine that the finger is touched and determine a position of the finger. In addition, when an induced electromotive current is detected at the coil unit, the position measuring apparatus may determine that the pen 2260 is touched and determine a position of the pen.

Figure 23:
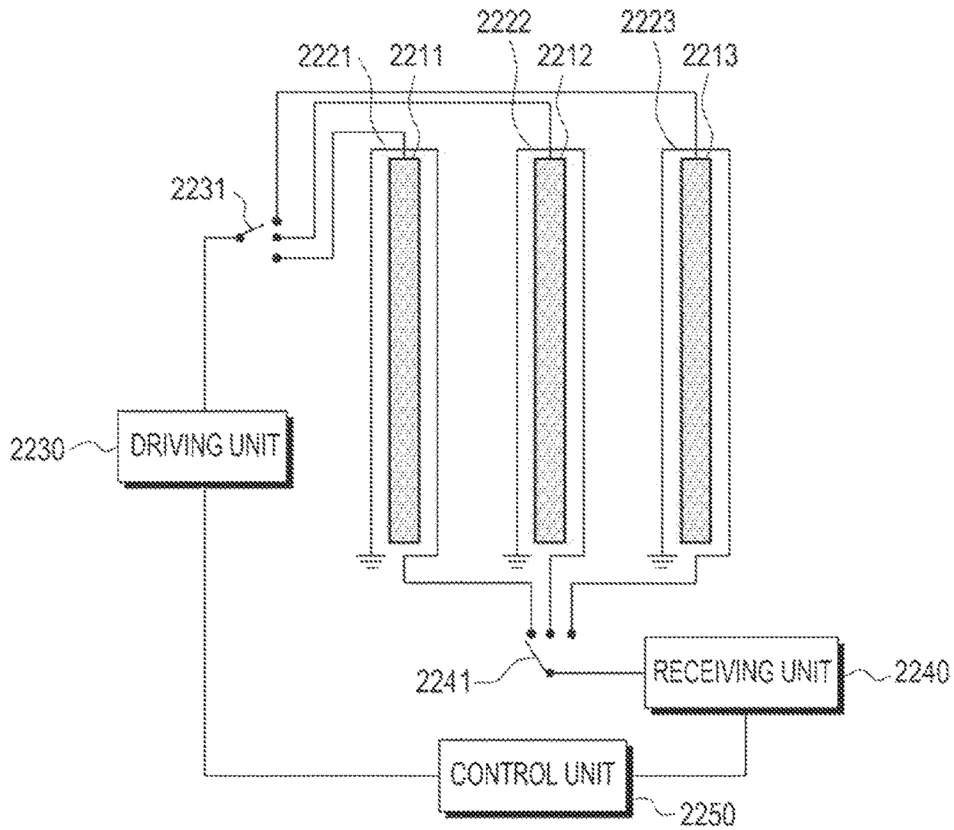
FIG. 23 illustrates a configuration diagram of a position measuring apparatus according to various embodiments of the present disclosure.

FIG. 23 illustrates a configuration diagram of a position measuring apparatus according to various embodiments of the present disclosure.

A driving unit 2230 may be connected to a driving electrode among electrodes 2211, 2212 and 2213 during a driving period, that is a first period. The driving unit 2230 may be connected to the driving electrode among the electrodes 2211, 2212 and 2213 through a first switch 2231. For example, when the first electrode 2211 is determined as the driving electrode, the first switch 2231 may connect the driving unit 2230 with the first electrode 2211 during the first period. A control unit 2250 may control the first switch 2231 and the driving unit 2230 such that the first switch 2231 connects the driving unit 2230 with the first electrode 2211 during the first period.

A receiving unit 2240 may process received signals which are received from each of coils 2221, 2222 and 2223 or induced electromotive currents from each of coils 2221, 2222 and 2223 and transfer processed received signals or induced electromotive currents to the control unit 2250. For example, the receiving unit 2240 may perform an amplification, a noise elimination, a digital conversion, a conversion into a signal on a frequency area and the like for the received signal or the induced electromotive currents. A second switch 2241 may connect the receiving unit 2240 with the first coil 2221 during a first of a non-driving period, and thus the received signal or the induced electromotive current from the first coil 2221 may be transferred to the control unit 2250. The second switch 2241 may connect the receiving unit 2240 with the second coil 2222 during a second of the non-driving period, and thus the received signal or the induced electromotive current from the second coil 2222 may be transferred to the control unit 2250. A third switch 2243 may connect the receiving unit 2240 with the third coil 2223 during a third of the non-driving period, and thus the received signal or the induced electromotive current from the third coil 2223 may be transferred to the control unit 2250. The control unit 2250 may control the connections between the second switch 2241 and the coils 2221, 2222 and 2223. Meanwhile, another ends of the coils 2221, 2222 and 2223, which are not connected to the switch 2241 may be grounded.

Figure 24:
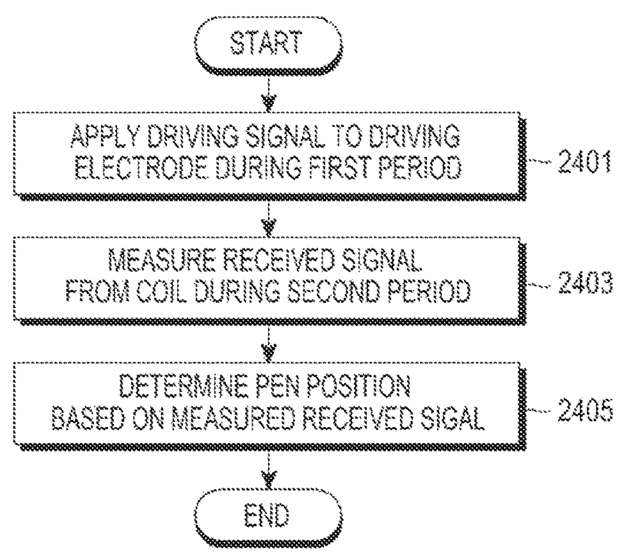
FIG. 24 illustrates a flowchart of a control method of a position measuring apparatus according to various embodiments of the present disclosure.
Figure 25:
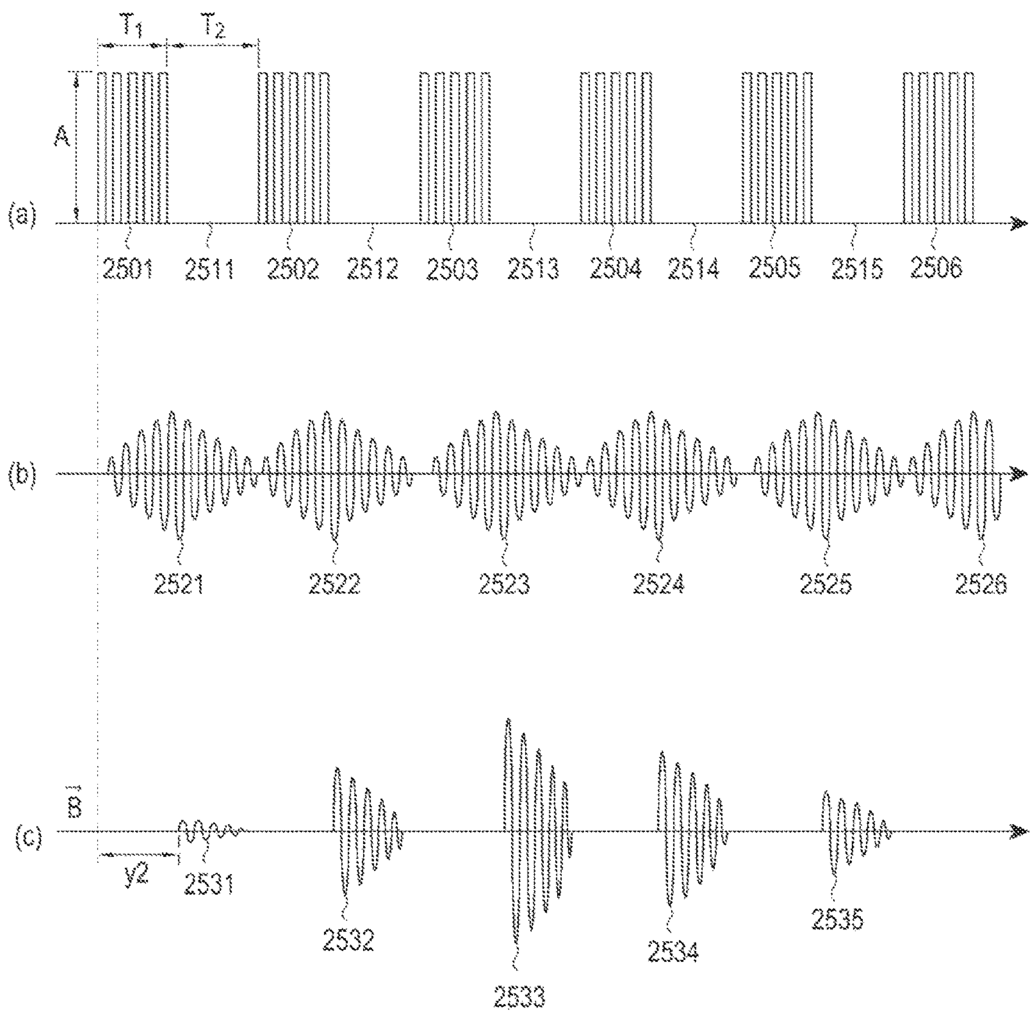
FIG. 25 illustrates signals according to various embodiments of the present disclosure.

FIG. 24 illustrates a flowchart of a control method of a position measuring apparatus according to various embodiments of the present disclosure. The embodiment of FIG. 24 will be described in more detail with reference to FIG. 25. FIG. 25 illustrates signals according to various embodiments of the present disclosure.

In step 2401, as shown in (a) of FIG. 25, a position measuring apparatus may apply driving signals 2501, 2502, 2503,2504,2505 and 2506 to a driving electrode during a first period T1, that is a driving period. The driving electrode may generate an electric field based on the applied driving signals 2501, 2502, 2503, 2504, 2505, and 2506. The electric field from the driving electrode may be transferred to a pen. The pen may generate resonances 2521, 2522, 2523, 2524, 2525 and 2526 as shown in (b) of FIG. 25 based on the transferred electric field, and an electromagnetic wave may be generated.

In step 2403, the position measuring apparatus may measure received signals 2531, 2532, 2533, 2534, 2535, and 2535 from coils during second periods 2511, 2512, 2513, 2514, 2515 and 2516, that is non-driving periods. The received signals 2531, 2532, 2533, 2534, 2535 and 2535 may be delayed by y1 compared to the driving signals 2501, 2502, 2503, 2504, 2505 and 2506. The position measuring apparatus may measure induced electromotive currents from each of the coils during the second periods 2511, 2512, 2513, 2514, and 2515. As described above, when an magnetic field of the electromagnetic wave from the pen is input, an induced electromotive current may be generated based on the magnetic field input from the coil. In the embodiment of FIG. 25, a size of the third received signal 2533 is larger than those of other signals.

In step 2405, the position measuring apparatus may determine a position of the pen based on the received signal measured at the coil or the induced electromotive current generated at the coil. For example, the position measuring apparatus may determine a coil of which a received signal or an induced electromotive current is the largest as the position of the pen. Alternatively, the position measuring apparatus may determine the position of the pen based on an interpolation result for the received signal or the induced electromotive current. In the embodiment of FIG. 25, the position measuring apparatus may determine a coil at which the third received signal 2533 is measured as the position of the pen.

Figure 26:
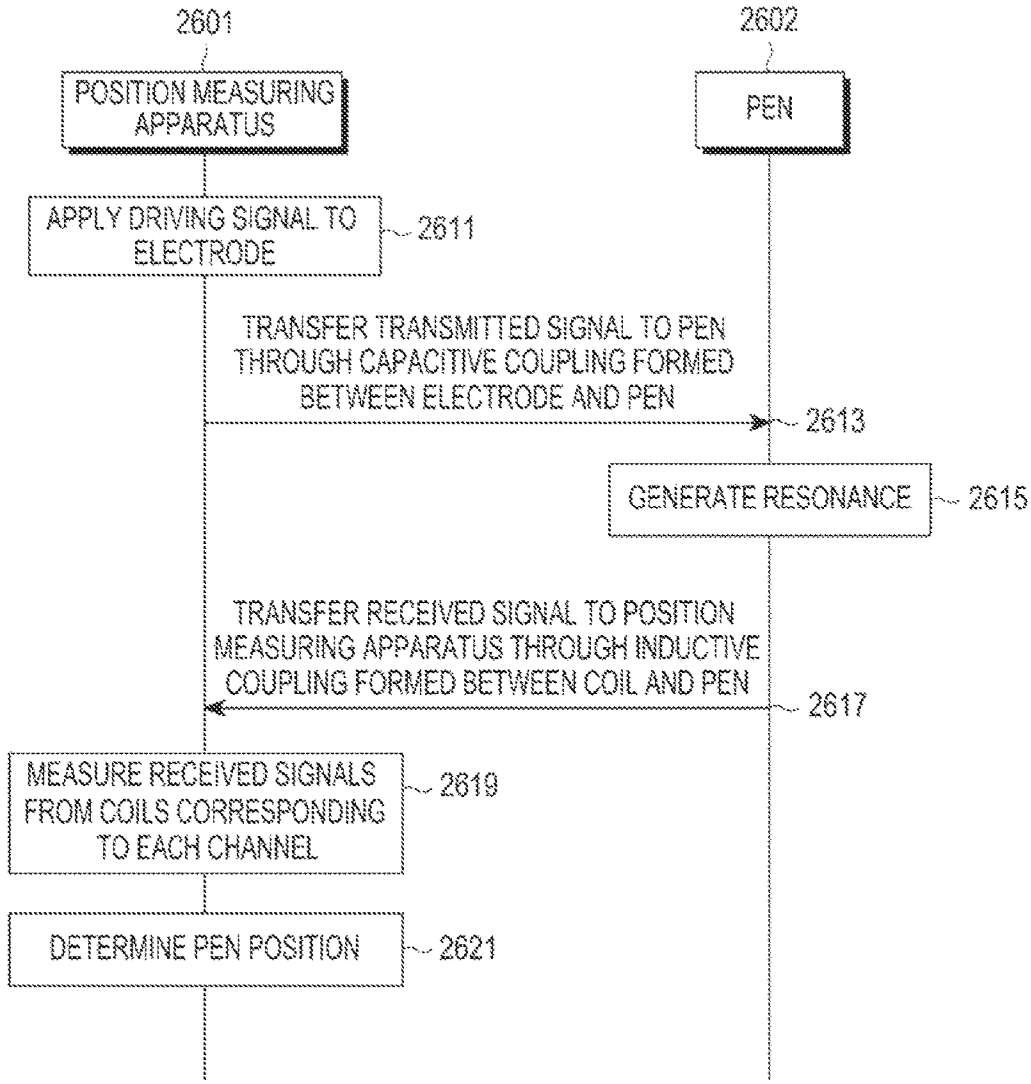
FIG. 26 illustrates a flowchart of a pen position measuring method according to various embodiments of the present disclosure.

FIG. 26 illustrates a flowchart of a pen position measuring method according to various embodiments of the present disclosure.

In step 2611, a position measuring apparatus 2601 may apply a driving signal to an electrode during a first period. The position measuring apparatus 2601 may include a plurality of electrodes for measuring a pen position, and may apply the driving signal to a driving electrode among the plurality of electrodes. The position measuring apparatus 2601 may determine a predetermined electrode as the driving electrode among the plurality of electrodes. Alternatively, the position measuring apparatus 2601 may re-determine an electrode corresponding to the determined pen position as the driving electrode for measuring a position of a next pen.

In step 2613, the driving electrode may transfer a transmission signal to the pen 2602 through a capacitive coupling formed between the driving electrode and the pen 2602. The driving electrode may form an electric field based on an applied current and the transmission signal of an electric field form may be transferred to the pen 2602.

In step 2615, the pen 2602 may generate a resonance based on the transferred transmission signal of the electric field form. The pen 2602 may include a resonance circuit, and may generate the resonance based on the transferred transmission signal. Thus, the pen 2602 may generate an electromagnetic wave.

In step 2617, the pen 2602 may transfer a received signal of a magnetic field form to the position measuring apparatus 2601 through a inductive coupling formed between each of plurality of coils and the pen. In step 2619, the position measuring apparatus 2601 may measure the received signals at each coils corresponding to each channel. The position measuring apparatus 2601 may measure the received signals at each electrode corresponding to each channel during a second period where the driving signal is not applied, that is a non-driving period. More specifically, the position measuring apparatus 2601 may measure a received signal at an electrode of a first coil during a first of the non-driving period, and may measure a received signal at a coil of a second channel during a second of the non-driving period. The position measuring apparatus 2601 may measure received signals which are received from all electrodes included therein.

In step 2621, the position measuring apparatus 2601 may determine the position of the pen based on the received signals which are received from the coil corresponding to each channel. The coils corresponding to each channel may generate induced electromotive currents based on the received signals, and the position measuring apparatus 2601 may determine the position of the pen based on the currents generated from the coils corresponding to each channel. For example, the position measuring apparatus 2601 may determine a coil from which a current having a comparatively large size is generated as the position of the pen. The position measuring apparatus 1501 may determine a y-axis position of the pen 2602 based on induced electromotive currents generated from coils extending in an x-axis direction and may determine an x-axis position of the pen 2602 based on induced electromotive currents generated from coils extending in a y-axis direction.

Figure 27:
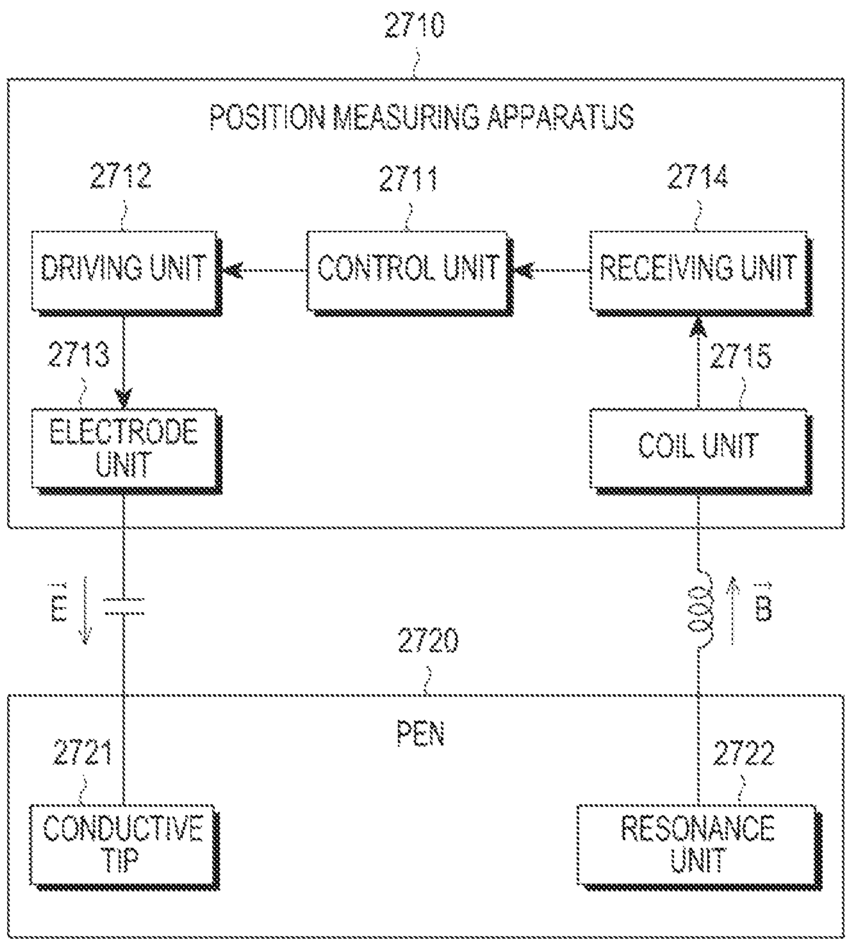
FIG. 27 illustrates a block diagram of a position measuring apparatus and a pen according to various embodiments of the present disclosure.

FIG. 27 illustrates a block diagram of a position measuring apparatus and a pen according to various embodiments of the present disclosure.

As shown in FIG. 27, a position measuring apparatus 2710 may include a control unit 2711, a driving unit 2712, an electrode unit 2713, a receiving unit 2714 and a coil unit 2715. In addition, a pen 2720 may include a conductive tip 2721 and a resonance unit 2722.

The control unit 2711 may control the driving unit 2712 such that the driving unit 2712 provides a driving signal during a first period. The control unit 2711 may control the driving unit 2712 such that the driving unit 2712 is connected to a driving electrode of an electrode unit 2713. The driving electrode may generate an electric field based on the driving signal transferred from the driving unit 2712 during the first period. The driving electrode of the electrode unit 2713 may form a capacitive coupling with a conductive tip 2721 of the pen 2720. The driving electrode may transmit a transmission signal of an electric field form to the pen 2720 through a capacitive coupling.

The resonance unit 2722 of the pen 2720 may generate a resonance based on the transmission signal of the electric field form from the driving electrode. An electromagnetic field may be generated by the resonance, and a magnetic field, that is a received signal may be transferred through inductive coupling formed between the resonance unit 2722 and the coil unit 2715.

The receiving unit 2714 may process the received signals, which are received from each coil of the coil unit 2715 and transmit the processed received signals to the control unit 2711. The control unit 2711 may control the receiving unit 2714 such that the receiving unit 2714 is connected to the coil unit 2715 during a second period different from the first period. Each of coils of the coil unit 2715 may output currents to the receiving unit 2714 based on the received signals. The receiving unit 2714 may perform, for example, an amplification, a noise elimination, a digital conversion, a conversion into a signal on a frequency area and the like for the received signal or the currents.

The control unit 2711 may measure the position of the pen 2720 based on the received signals or the currents from each coil of the coil unit 2715. In one embodiment, the control unit 2711 may determine a position of a channel coil of which a received signal or a current is the largest among the received signals or currents from each coil as the position of the pen. In addition, the control unit 2711 may also determine the position of the pen based on a comparative size of the received signals or currents received from each coil. In addition, the control unit 2711 may also determine the position of the pen based on an interpolation result for the received signals or currents from each coil.

Figure 28A:
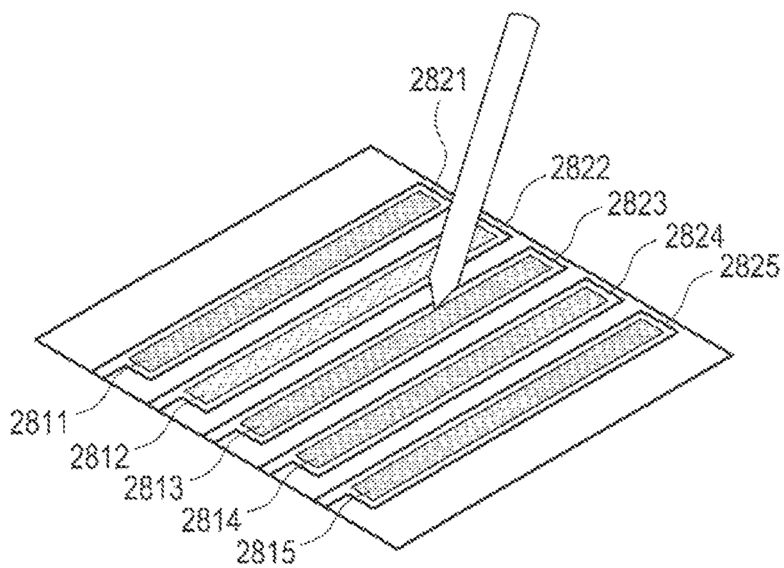
FIG. 28A illustrates a conceptual diagram of a case in which a pen according to various embodiments of the present disclosure touches a panel.

FIG. 28A illustrates a conceptual diagram in a case in which a pen according to various embodiments of the present disclosure touches a panel.

Figure 28B:
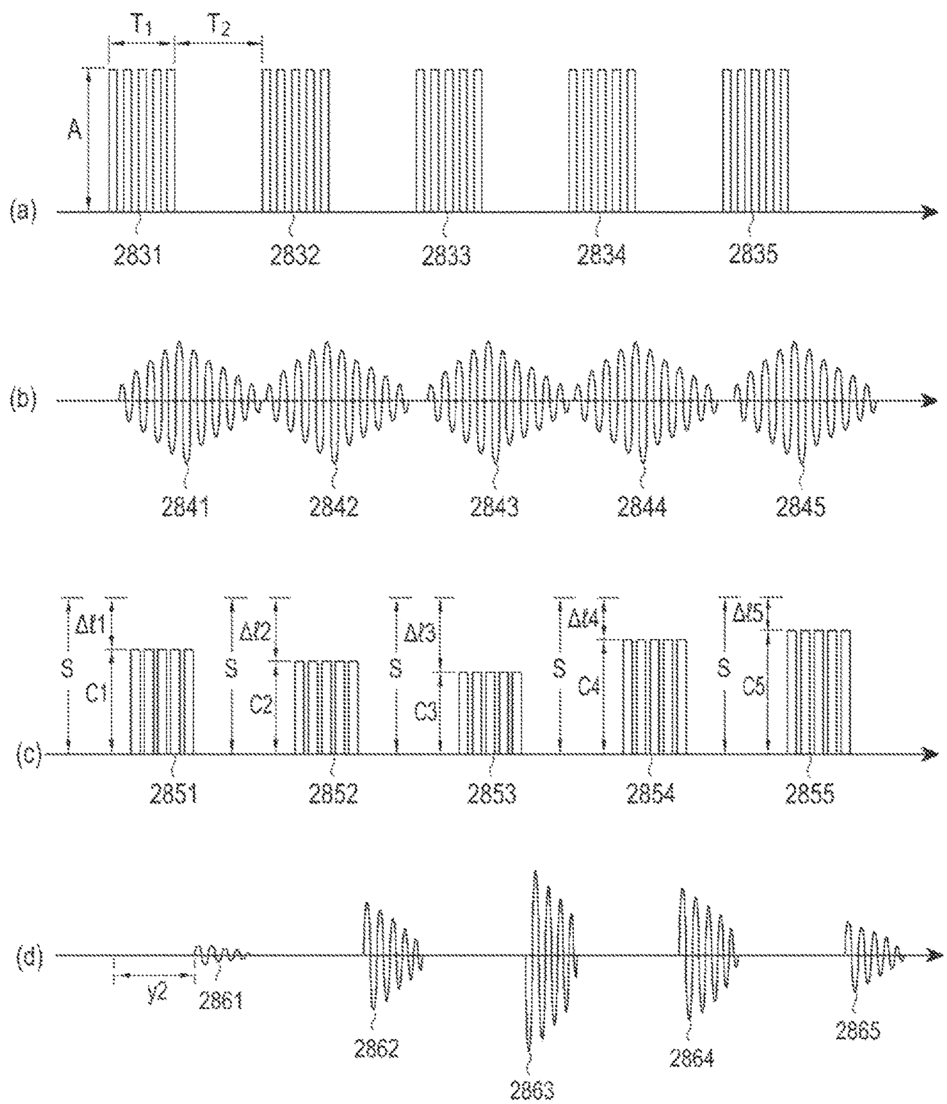
FIG. 28B illustrates waveforms of signals generated or measured by various embodiments of the present disclosure.

As shown in FIG. 28A, it is assumed that a pen touches a third electrode 2813 and a third coil 2823. FIG. 28B illustrates a transmitted signal and a received signal of a case in which a pen according to various embodiments of the present disclosure touches a panel.

A driving unit may apply driving signals 2831 to 2835 to a driving electrode as shown in (a) of FIG. 28B. A position measuring apparatus may apply the first driving signal 2831 to the driving electrode during a driving period T1 and apply the second driving signal 2832 to the driving electrode during the driving period T1 after a non-driving period T2. Each of the driving signals 2831 to 2835 may have an amplitude A. The driving electrode may generate an electric field based on the driving signals 2831 to 2835.

The pen may generate resonances 2841 to 2845 based on the electric field received from the driving electrode as shown in (b) of FIG. 28B.

(c) of FIG. 28B illustrates received signals from each of electrodes 2811 to 2815. First, during the first period, the received signals 2851 to 2855 may be measured. The third electrode 2813 may have the largest capacitance change due to a touch from the pen to the third electrode 2813. Therefore, during the first period, as shown (c) of FIG. 28B, the received signal 2853 from the third electrode 2813 may have the lowest amplitude. A position measuring apparatus may determine the third electrode 2813 of which the received signal 2853 is the least, as an electrode of which a capacitance change is the largest, which is a touched electrode.

During the second period, as shown in (b) of FIG. 28B, coils 2821 to 2825 may receive received signals 2861 to 2865 from the pen. Since the received signals 2861 to 2865 are an magnetic field by a resonance, the received signals 2861 to 2865 may have alternating current waveforms.

The position measuring apparatus may determine a touch point of the pen based on the received signals 2851 to 2865 during the first period, which is the driving period, from each of the electrodes 2811 to 2815. In addition, the position measuring apparatus may determine that a touched object is the pen based on the received signals 2851 to 2865 during the second period, which is a non-driving period. When a finger touches, any signal may not be received during the second period. Thus, the position measuring apparatus may determine a type of a touched object as one of the pen and the finger based on a measurement-or-not of the received signal or an existence-or-not of an alternating current waveform during the second period, which is the non-driving period.

Figure 29:
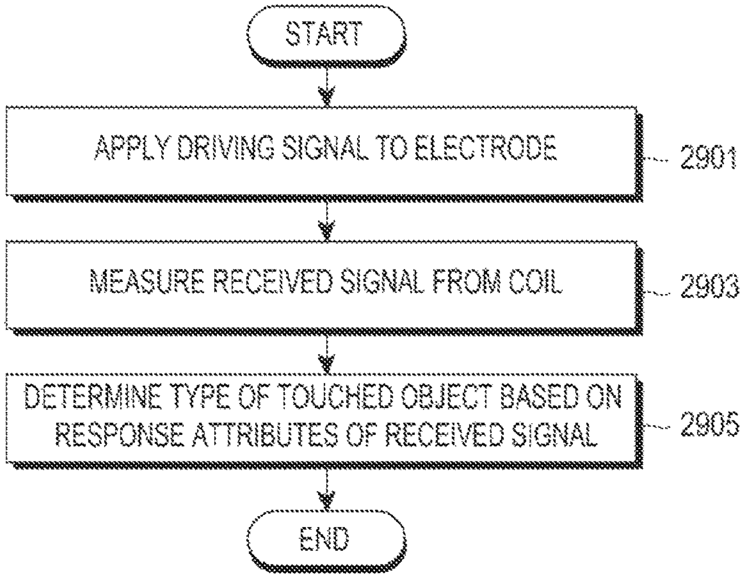
FIG. 29 illustrates a flowchart of a control method of a position measuring apparatus according to various embodiments of the present disclosure.

FIG. 29 illustrates a flowchart of a control method of a position measuring apparatus according to various embodiments of the present disclosure.

In step 2901, the position measuring apparatus may apply a driving signal to a driving electrode during a first period, that is a driving period. The driving electrode may generate an electric field based on the driving signal during the driving period.

The position measuring apparatus may measure received signals from each coil during a non-driving period, that is a second period. Alternatively, the position measuring apparatus may measure currents from each coil during the non-driving period.

In step 2905, the position measuring apparatus may determine a type of a touched object based on response attributes of the received signal during the non-driving period. For example, when it is determined that the received signal during the non-driving period includes an alternating current waveform, the position measuring apparatus may determine that the touched object is a pen. In addition, when it is determined that the received signal during the non-driving period does not include an alternating current waveform, the position measuring apparatus may determine that the touched object is a finger. For example, the position measuring apparatus may convert the signal during the non-driving period into a signal on a frequency area and detect whether the signal includes a specific frequency, which is a resonance frequency component to determine whether the signal includes an alternating current waveform. Meanwhile, a person having an ordinary skill in the art may easily understand that a configuration of the position measuring apparatus which determines whether the signal includes an alternating current waveform is not limited.

Figure 30:
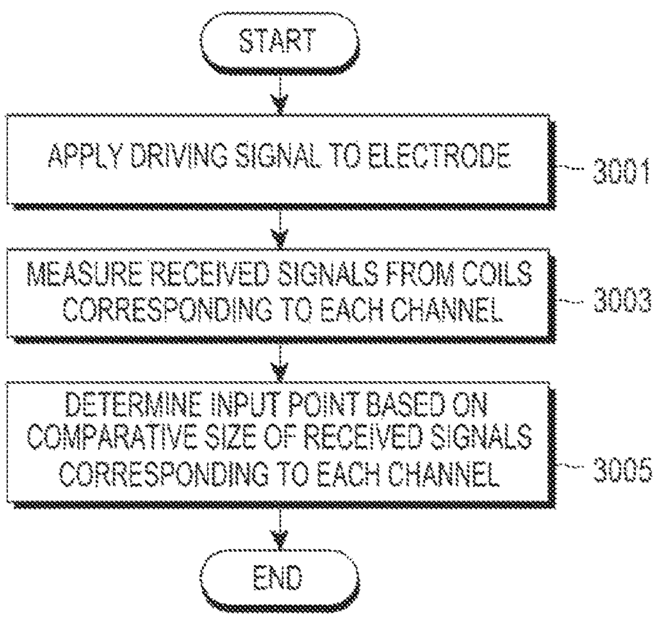
FIG. 30 illustrates a flowchart of a control method of a position measuring apparatus according to various embodiments of the present disclosure.
Figure 31A:
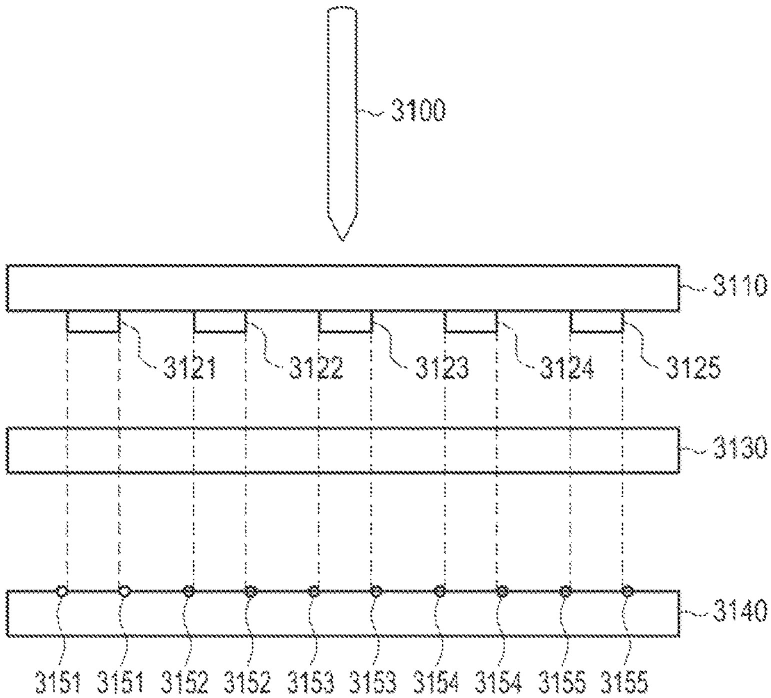
FIG. 31A illustrates a conceptual diagram of a position measuring apparatus according to various embodiments of the present disclosure.
Figure 31B:
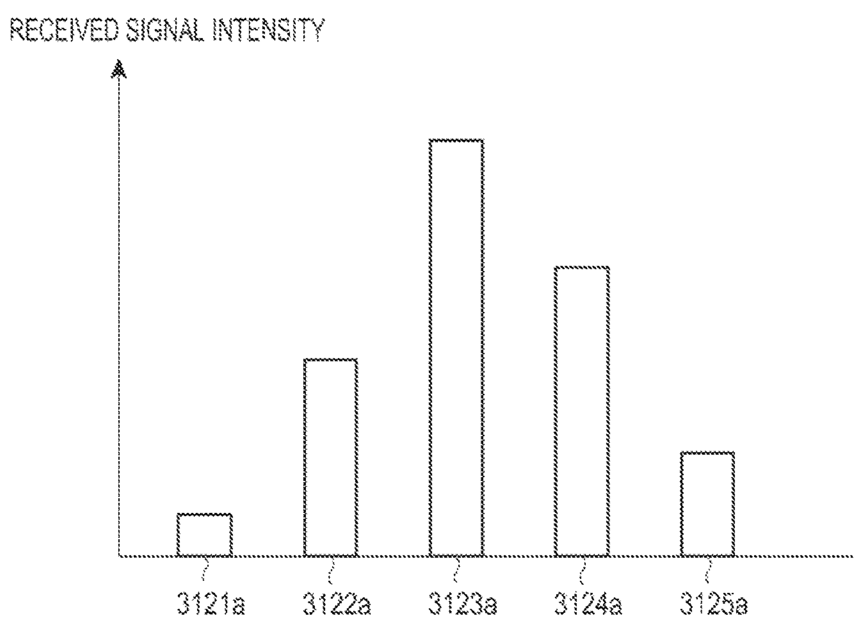
FIG. 31B illustrates a graph of received signals from electrodes corresponding to each channel according to various embodiments of the present disclosure.

FIG. 30 illustrates a flowchart of a control method of a position measuring apparatus according to various embodiments of the present disclosure. The embodiment of FIG. 30 will be described in more detail with reference to FIGS. 31A and 31B. FIGS. 31A and 31B illustrate conceptual diagrams of a position measuring apparatus according to various embodiments of the present disclosure. FIG. 31B illustrates a graph of received signals from electrodes corresponding to each channel according to various embodiments of the present disclosure.

In step 3001, the position measuring apparatus may apply a driving signal to a driving electrode during a driving period. As shown in FIG. 31A, the position measuring apparatus may include a display panel 3130 and a substrate 3140. In addition, one or more coils 3151 to 3155 may be disposed at an upper side of the substrate 3140.

The position measuring apparatus may determine one among one or more electrodes 3121 to 3126 as the driving electrode and apply the driving signal to the determined electrode.

In step 3003, the position measuring apparatus may measure received signals from each of the coils 3151 to 3156 corresponding to each channel, in other words, resonance signals, during a non-driving period. For example, the position measuring apparatus may measure the received signals corresponding to each of channels 3151 to 3155*a* as shown in FIG. 31B. As shown in FIG. 31B, a resonance signal intensity at the channel 3153*a* corresponding to the third coil 3153 is the strongest. The closer a distance between a pen and an electrode is, the stronger an intensity a magnetic field transmitted and received between the pen and the electrode, which is the resonance signal, may be. In addition, the farther the distance from the pen is, the more the intensity of the resonance signal is reduced. Thus, the position measuring apparatus may determine a position of the pen from a comparative size of such a received signal. In the embodiment of FIG. 31B, the third coil 3153 of the channel 3153*a* of which the size is the largest may be determined as the position of the pen. Meanwhile, various noise, in addition to the resonance signal generated from the pen, may be simultaneously input to the coils 3151 to 3155. The input noise may disturb a calculation of an accurate touched position.

Figure 32:
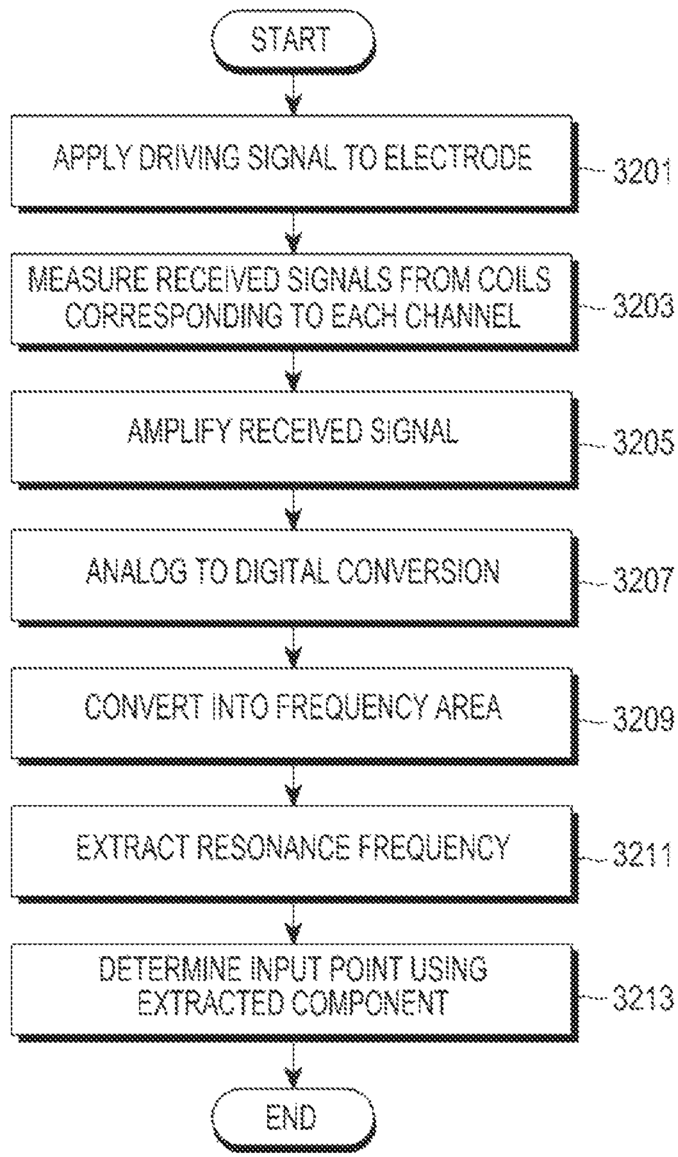
FIG. 32 illustrates a flowchart of a control method of a position measuring apparatus according to various embodiments of the present disclosure.

FIG. 32 illustrates a flowchart of a control method of a position measuring apparatus according to various embodiments of the present disclosure. FIG. 32 will be described in more detail with reference to FIG. 33.

The position measuring apparatus according to various embodiments of the present disclosure may extract a signal of a resonance frequency area among received resonance signals. As described above, a resonance signal from a pen may have a resonance frequency. The position measuring apparatus according to various embodiments of the present disclosure may extract a signal of a resonance frequency band, and thus a Signal to Noise Ratio (SNR) may be improved.

In step 3201, the position measuring apparatus may apply a driving signal to a driving electrode during a driving period. In step 3203, the position measuring apparatus may measure received signals from each of coils 3311 to 3316 corresponding to each channel during a non-driving period.

Figure 33:
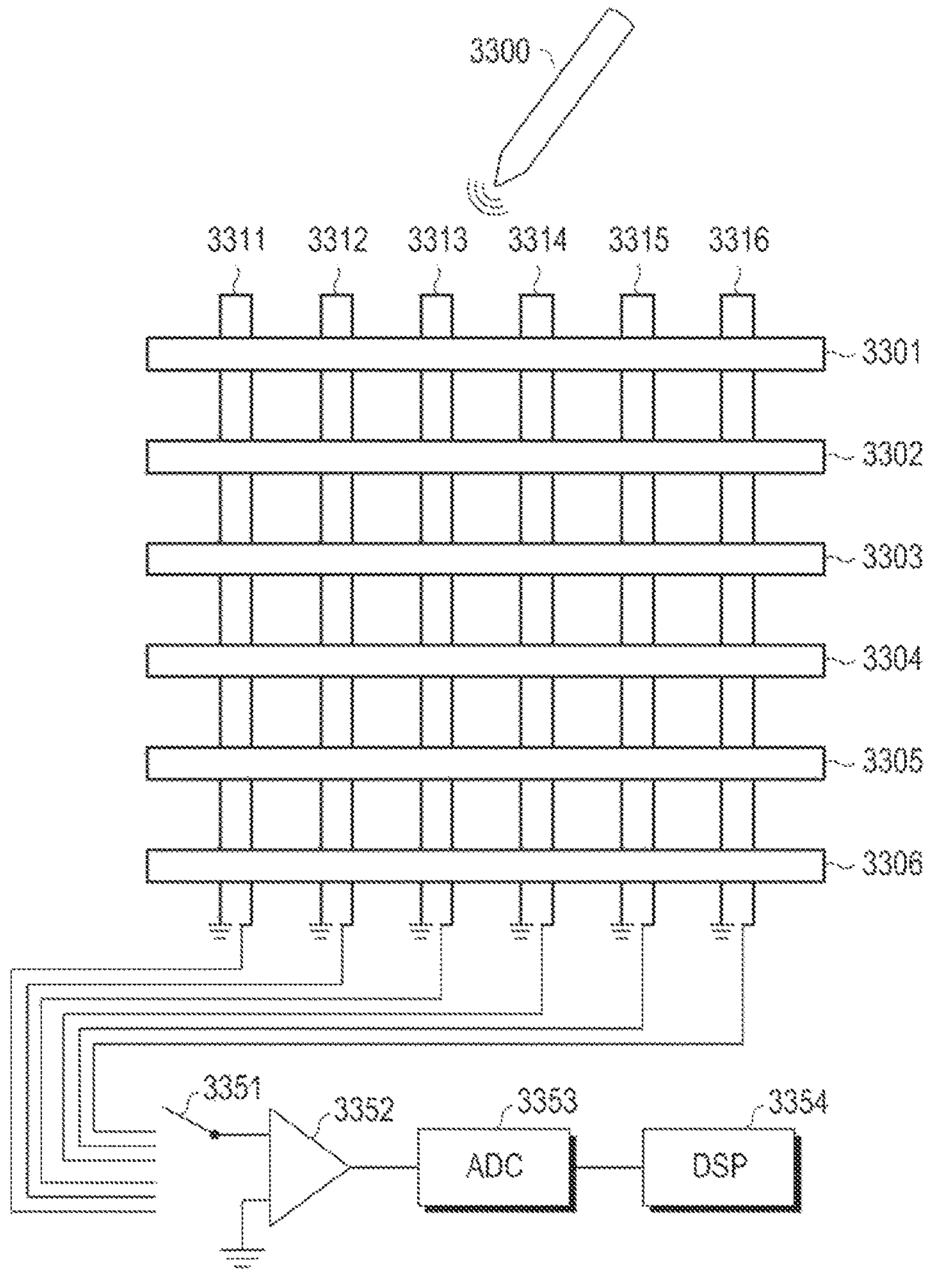
FIG. 33 illustrates a conceptual diagram of a position measuring apparatus according to various embodiments of the present disclosure.

In step 3205, the position measuring apparatus may amplify the received signal measured during the non-driving period. For example, as shown in FIG. 33, the coils 3311 to 3316 may be connected to an amplifier 3352 through a switch 3351. The amplifier 3352 may amplify the received resonance signal and transfer the amplified resonance signal to an Analog to Digital Converter (ADC) 3353.

In step 3207, the ADC 3353 may convert the received resonance signal of an analog form to a digital signal. In step 3209, a Digital Signal Processing (DSP) unit 3354 may perform a Fourier transform on the digital signal to convert the digital signal into a signal on a frequency area. In step 3211, the DSP 3354 may extract a component of a first frequency, that is a resonance frequency, or a band signal including a resonance frequency, among the Fourier-transformed signals. In step 3213, the position measuring apparatus may determine an input point using the extracted component. Therefore, remaining noise, except for the resonance signal, may be excluded, and thus SNR may be improved.

What is claimed is:

1. A position measuring apparatus, the position measuring apparatus comprising:
- a plurality of electrodes; and
- a processor configured to control to at least:
  - transmit an electric field transmission signal generated from a first electrode among the plurality of electrodes to a pen through a capacitive coupling formed between the first electrode among the plurality of electrodes and a conductive pen tip of the pen during a first period, by applying a driving signal to the first electrode among the plurality of electrodes during the first period,
  - stop transmitting the electric field transmission signal during a second period after the first period, wherein the driving signal is not applied to the first electrode among the plurality of electrodes during the second period,
  - receive, at one or more electrodes among the plurality of electrodes through respective capacitive couplings formed between the one or more electrodes and the conductive pen tip, an electric field reception signal from the pen corresponding to the electric field transmission signal during the second period after the first period,
  - identify a position of the pen based on a comparative size of a current output from the one or more electrodes that receive the electric field reception signal during the first period, and
  - identify the position of the pen based on a strength of the electric field reception signal which is received at the one or more electrodes during the second period,
- wherein the pen is configured to generate an electromagnetic reception signal comprising the electric field reception signal and a magnetic field reception signal by producing resonance based on the electric field transmission signal, and
- wherein the first period is not overlapping the second period.

2. The position measuring apparatus of claim 1, further comprising:
- an amplifier configured to amplify the electric field reception signal; and
- an analog to digital converter configured to convert the amplified reception signal,
- wherein the processor is further configured to:
  - convert the converted amplified reception signal to a reception signal on a frequency area,
  - extract a resonance frequency component from the reception signal on the frequency area, and determine the position of the pen based on the resonance frequency component.

3. The position measuring apparatus of claim 1, wherein the processor is further configured to:

determine an electrode corresponding to the position of the pen, and determine the electrode corresponding to the position of the pen as the first electrode among the plurality of electrodes for generating the electric field transmission signal for a next position measurement.

4. The position measuring apparatus of claim 1, wherein the first electrode among the plurality of electrodes does not apply the driving signal during the second period.

5. The position measuring apparatus of claim 1, wherein the processor is further configured to control to detect a touch pressure of the pen based on a frequency of the electric field reception signal.

6. The position measuring apparatus of claim 1, wherein the processor is further configured to determine a switch on and a switch off condition of the pen based on a frequency of the electric field reception signal.

7. The position measuring apparatus of claim 1, wherein the first electrode among the plurality of electrodes is included in the one or more electrodes among the plurality of electrodes, wherein the processor is further configured to control so that the first electrode among the plurality of electrodes generates the electric field transmission signal in the first period, and to stop the transmission of the electric field transmission signal in the second period, and wherein the processor is further configured to control so that the first electrode among the plurality of electrodes receives the electric field reception signal during the second period.

8. The position measuring apparatus of claim 1, wherein the one or more electrodes through which the electric field reception signal is received comprises the first electrode among the plurality of electrodes from which the electric field transmission signal is generated.

9. A position measuring apparatus, the position measuring apparatus comprising:

a plurality of electrodes;

a driving circuit configured to apply a driving signal to a first electrode among the plurality of electrodes during a first period, wherein the first electrode among the plurality of electrodes transmits an electric field transmission signal to a pen through a capacitive coupling formed between the first electrode among the plurality of electrodes and a conductive pen tip of the pen; and a processor configured to at least:

control to stop applying the driving signal such that the transmission of the electric field transmission signal from the plurality of electrodes is stopped, during a second period after the first period, determine a position of the pen based on a comparative size of a current output from the one or more electrodes that receive the electric field reception signal during the first period, and determine the position of the pen based on a strength of a current, which corresponds to a strength of an electric field reception signal, generated from one or more electrodes among the plurality of electrodes that receive the electric field reception signal from the pen through respective capacitive couplings formed between the one or more electrodes and the conductive pen tip of the pen during the second period, wherein the pen generates an electromagnetic reception signal comprising the electric field reception signal and a magnetic field reception signal by producing resonance based on the electric field transmission signal, and wherein the first period is not overlapping the second period.

10. The position measuring apparatus of claim 9, wherein the first electrode among the plurality of electrodes is included in the one or more electrodes among the plurality of electrodes, wherein the processor is further configured to control to apply the driving signal to the first electrode among the plurality of electrodes during a first time period and to stop applying the driving signal to the first electrode among the plurality of electrodes during a second time period, and wherein the processor is further configured to control so that the first electrode among the plurality of electrodes receives the electric field reception signal during the second time period.

11. The position measuring apparatus of claim 9, wherein the one or more electrodes through which the electric field reception signal is received comprises the first electrode among the plurality of electrodes from which the electric field transmission signal is generated.

12. A method for determining a position of a pen at a position measuring apparatus, the method comprising:

transmitting, from the position measuring apparatus, an electric field transmission signal generated from a first electrode among a plurality of electrodes of the position measuring apparatus to the pen through a capacitive coupling formed between the first electrode among the plurality of electrodes and a conductive pen tip of the pen during a first period, by applying a driving signal to the first electrode among the plurality of electrodes during the first period;

stopping transmitting the electric field transmission signal during a second period after the first period, wherein the driving signal is not applied to the first electrode among the plurality of electrodes during the second period;

receiving, from the pen, an electric field reception signal corresponding to the electric field transmission signal at one or more electrodes among the plurality of electrodes of the position measuring apparatus through respective capacitive couplings formed between the one or more electrodes and the conductive pen tip during the second period;

identifying a position of the pen based on a comparative size of a current output from the one or more electrodes that receive the electric field reception signal during the first period; and identifying the position of the pen based on a strength of the electric field reception signal which is received at the one or more electrodes during the second period, wherein the pen generates an electromagnetic reception signal comprising the electric field reception signal and a magnetic field reception signal by producing resonance based on the electric field transmission signal, and wherein the first period is not overlapping the second period.

* * * * *